US009106346B2

(12) United States Patent
Leven et al.

(10) Patent No.: US 9,106,346 B2
(45) Date of Patent: Aug. 11, 2015

(54) METHOD OF DECODING OPTICAL DATA SIGNALS

(75) Inventors: Andreas Leven, Bietigheim-Bissingen (DE); Stephan Ten Brink, Stuttgart (DE)

(73) Assignee: Alcatel Lucent, Boulogne-Billancourt (FR)

(*) Notice: Subject to any disclaimer, the term of this patent is extended or adjusted under 35 U.S.C. 154(b) by 60 days.

(21) Appl. No.: 14/000,333

(22) PCT Filed: Mar. 22, 2012

(86) PCT No.: PCT/EP2012/055138
§ 371 (c)(1),
(2), (4) Date: Aug. 19, 2013

(87) PCT Pub. No.: WO2012/130733
PCT Pub. Date: Oct. 4, 2012

(65) Prior Publication Data
US 2014/0016947 A1    Jan. 16, 2014

(30) Foreign Application Priority Data

Mar. 31, 2011    (EP) .................................... 11160751

(51) Int. Cl.
*H04B 10/00* (2013.01)
*H04B 10/61* (2013.01)
(Continued)

(52) U.S. Cl.
CPC ...... *H04B 10/6165* (2013.01); *H04L 25/03178* (2013.01); *H04L 27/233* (2013.01)

(58) Field of Classification Search
USPC ................................................. 398/202–214
See application file for complete search history.

(56) References Cited

U.S. PATENT DOCUMENTS 5,452,331 A * 9/1995 Shihabi et al. ................ 375/324
5,854,570 A * 12/1998 Schmidt ........................ 329/304
(Continued)

FOREIGN PATENT DOCUMENTS

EP    0381636    8/1990
JP    2002314436    10/2002
(Continued)

OTHER PUBLICATIONS

Adachi, F.; Reduced State Transition Viterbi Differential Detection of M-ary DPSK signals; Electronics Letters, IEE Stevenage, GB, vol. 32, No. 12, Jun. 6, 1996; pp. 1064-1066; XP006005218; ISSN: 0013-5194; DOI: 10.1049/EL:19960707.
(Continued)

*Primary Examiner* — Agustin Bello
(74) *Attorney, Agent, or Firm* — Patti & Malvone Law Group, LLC

(57) ABSTRACT

Proposed is a method of deriving differentially decoded data values from a received differentially encoded phase modulated optical signal. The method uses an estimation algorithm in order to find derive a sequence of differentially decoded data values. The algorithm stipulates transition probabilities between hypothetical first states, representing differentially encoded data symbols assuming that no phase slip has occurred, and transition probabilities towards hypothetical second states, which represent differentially encoded data symbols assuming that a phase slip has occurred. The transition probabilities between the first and second states are weighted on the basis of a predetermined phase slip probability value.

6 Claims, 22 Drawing Sheets

(51) Int. Cl.
*H04L 27/233* (2006.01)
*H04L 25/03* (2006.01)

(56) References Cited

U.S. PATENT DOCUMENTS

| | | | | |
|---|---|---|---|---|
| 6,246,730 | B1 | 6/2001 | Ono | |
| 7,606,498 | B1* | 10/2009 | Wu et al. | 398/152 |
| 8,166,365 | B2* | 4/2012 | Harley et al. | 714/752 |
| 8,233,809 | B2* | 7/2012 | Qian et al. | 398/208 |
| 8,538,279 | B2* | 9/2013 | Li et al. | 398/208 |
| 8,929,749 | B2* | 1/2015 | Roberts et al. | 398/208 |
| 2004/0225438 | A1* | 11/2004 | Draganov | 701/213 |
| 2005/0114023 | A1* | 5/2005 | Williamson et al. | 701/214 |
| 2005/0190868 | A1 | 9/2005 | Khandekar et al. | |
| 2006/0245766 | A1* | 11/2006 | Taylor | 398/208 |
| 2007/0092260 | A1* | 4/2007 | Bontu et al. | 398/152 |
| 2009/0147839 | A1* | 6/2009 | Grenabo | 375/226 |
| 2009/0268857 | A1* | 10/2009 | Chen et al. | 375/351 |
| 2011/0150505 | A1* | 6/2011 | Roberts et al. | 398/208 |
| 2014/0016947 | A1* | 1/2014 | Leven et al. | 398/208 |
| 2014/0195878 | A1* | 7/2014 | Razzetti et al. | 714/776 |
| 2014/0359396 | A1* | 12/2014 | Cideciyan et al. | 714/764 |

FOREIGN PATENT DOCUMENTS

| | | |
|---|---|---|
| JP | 2012514430 | 6/2012 |
| KR | 20060132744 | 12/2006 |

OTHER PUBLICATIONS

Zhou, S. D. et al; Viterbi Decoder Without Carrier Recovery; Electronics Letters, IEE Stevenage, GB, vol. 32, No. 23; Nov. 7, 1996; pp. 2124-2125; XP006005966; ISSN: 0013-5194; DOI: 10.1049/EL:19961460.

Franceschini, M. et al; Serial concatenation of LDPC codes and differential modulations; IEEE Trans. Commun., vol. 23, No. 9, pp. 1758-1768, Sep. 2005.

Viterbi, A.J. et al; Nonlinear estimation of PSK-modulated carrier phase with application to burst digital transmission; IEEE Transaction on Information Theory, 1983, IT-29, pp. 543-551.

Pfau, T. et al; Hardware-Efficient Coherent Digital Receiver Concept With Feedforward Carrier Recovery for M—QAM Constellations; Journal of Lightwave Technology, vol. 27, No. 8; Apr. 15, 2009; pp. 989-999; 2009.

Leven, A. et al; Frequency Estimation in Intradyne Reception; Photonics Technology Letters, IEEE, vol. 19, No. 6; Mar. 15, 2007; pp. 366-368.

D'Amico, A. et al; Efficient non-data-aided carrier and clock recovery for satellite DVB at very low signal-to-noise ratios; Selected Areas in Communications, IEEE Journal on, vol. 19, No. 12; Dec. 2001; pp. 2320-2330.

Viterbi, A.J.; Error bounds for convolutional codes and an asymptotically optimal decoding algorithm; IEEE Transactions on Information Theory, vol. IT-13, No. 2; pp. 260-269; Apr. 1967.

Rabiner, L.; A Tutorial on Hidden Markov Models and Selected Applications in Speech Recognition; IEEE Proceedings, vol. 77, No. 2, Feb. 1989.

Hagenauer, J. et al; Iterative Decoding of Binary Block and Convolutional Codes; IEEE Transactions on Information Theory, vol. 42, No. 2; Mar. 1996.

Bahl, L.R. et al; Optimal Decoding of Linear Codes for minimizing symbol error rate; IEEE Transactions on Information Theory, vol. IT-20(2); pp. 284-287; Mar. 1974.

Mackay, D.J.C.; Information Theory, Inference, and Learning Algorithms; Cambridge University Press 2003, Version 7.2, Mar. 28, 2005, Chapter 25, pp. 324 to 333.

Kschischang, F.R. et al; Factor graphs and the sum-product algorithm; IEEE Transactions on Information Theory, Vol. 47, No. 2, Feb. 2001.

Ten Brink, S.; Electronics Letters, vol. 35, No. 10; pp. 806-808; May 13, 1999.

\* cited by examiner

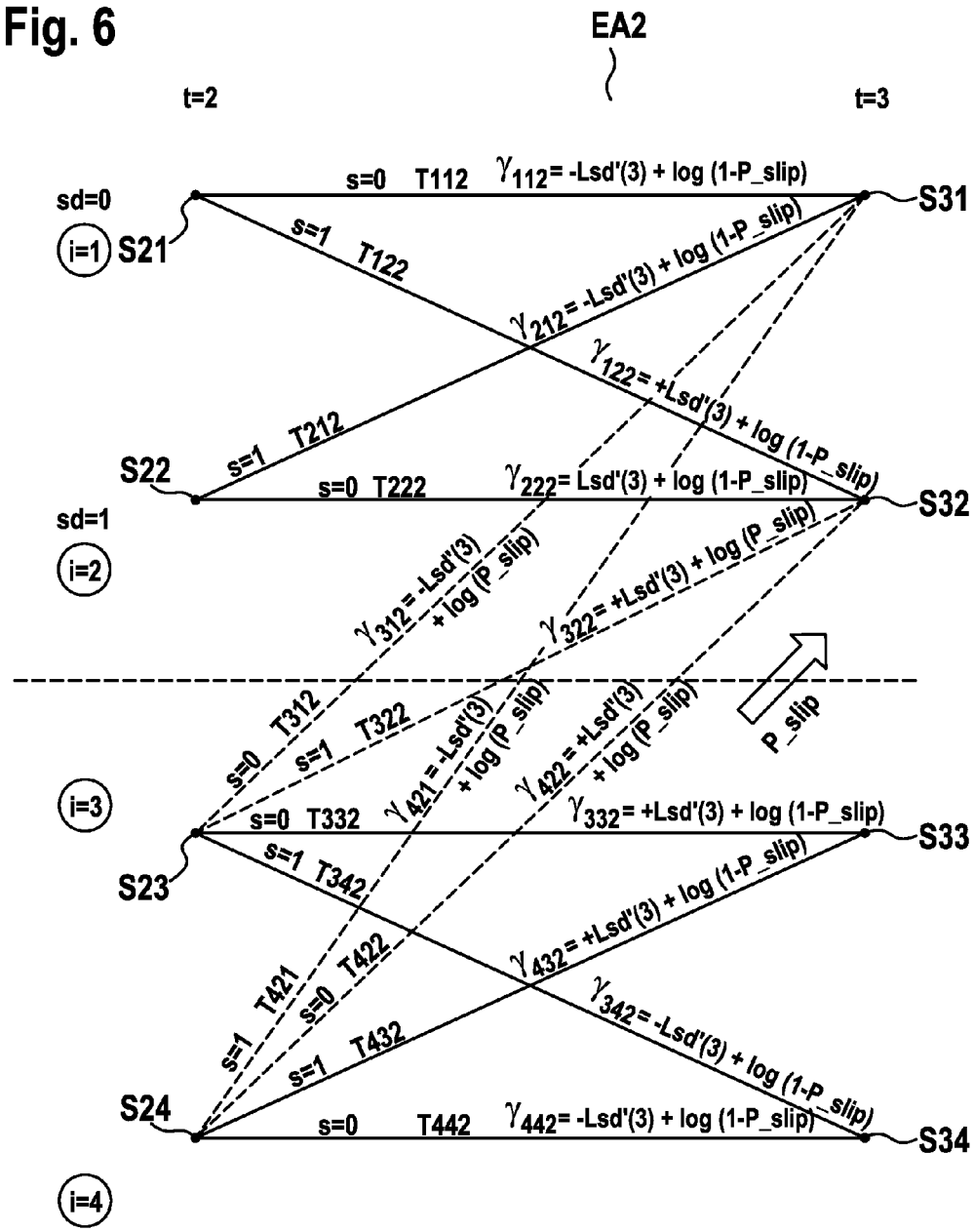

$$L\_sd'\_MSB = \frac{2}{\sigma_N^2} \cdot x$$

$$L\_sd'\_LSB = \frac{2}{\sigma_N^2} \cdot y$$

METHOD OF DECODING OPTICAL DATA SIGNALS

FIELD OF THE INVENTION

The invention relates to a method of optical data transmission.

BACKGROUND

In optical data transmission, digital data may be transmitted by means of an optical transmission signal. The optical transmission signal is generated, by modulating the phase of an optical carrier signal, which possesses a carrier frequency, in dependence on the transmitted data values and in accordance with a constellation diagram of a respective phase-shift keying (PSK) modulation method. Each point of the constellation diagram represents a finite set of data bits that are to be transmitted. Such a set of data bits is called a data symbol. A data symbol is represented by a corresponding constellation point of a constellation diagram, wherein the constellation point has a corresponding symbol phase value. Depending on the data symbols that are to be transmitted, respective constellation points and symbol phase values are derived. The phase of the optical carrier signal is modulated, such that it corresponds to the derived symbol phase values representing the transmitted data symbols.

An example for a phase-shift keying modulation method is Binary Phase-Shift Keying (BPSK), in which each point of the corresponding constellation diagram represents one bit and in which adjacent constellation points are separated by a separation angle that has an absolute value of $\pi$. Another example of a phase-shift keying modulation methods is Quadrature Phase-Shift Keying (QPSK), in which each constellation point represents two bits and in which adjacent constellation points are separated by a separation angle that has an absolute value of $\pi/2$.

At a receiving side, data detection may be carried out using a coherent reception scheme: the received optical transmission signal is mixed with a coherent optical signal that possesses the carrier frequency and a phase, which is ideally equal to the phase of the optical carrier signal. This mixing yields a resulting optical baseband signal. The optical baseband signal is converted to a sampled electrical signal via analogue-digital conversion, and the phase of the sampled electrical signal is estimated for deriving received data values. Using a hard-decision detection scheme, it is decided for that point of the constellation diagram, whose symbol phase value is most similar to the estimated phase of the received optical carrier signal. From the estimated symbol phase values corresponding data symbols and corresponding data valued are then derived.

When transmitting optical signals over a non-ideal optical transmission channel, the phase of the transmitted optical carrier signal may be changed due to transmission distortions caused by linear and/or non-linear effects of the optical transmission channel. The phase of the optical transmission signal may be changed by an absolute phase error that is greater than half of the separation angle of the constellation diagram. The result of such a phase error in combination with hard decision detection would be false estimated symbol phase values and thus false derived data values for the amount of time, for which the phase error remains to exceed half of the separation angle. If the data values are for example data bits, then false estimated symbol phase values caused by such a phase error may result in bit inversion of one ore more data bits represented by a data symbol.

A common technique to compensate transmission errors caused by phase errors of the transmission channel is the technique of differential coding. On the transmission side, the derived data symbols are differentially encoded into differentially encoded data symbols. A derived data symbol is thus represented by a transition from one differentially encoded data symbol to a next successive differentially encoded data symbol. The differentially encoded data symbols are then mapped onto the PSK constellation diagram. On the receiving side, the received differentially encoded data symbols are observed. Differential decoding is performed, wherein a differentially decoded data symbol is derived from a transition from one differentially encoded data symbol to a next differentially encoded data symbol. In other words, transmitted derived data symbols are represented by phase changes between successive differentially encoded data symbols.

An optical transmission channel may cause a phase error of the optical transmission signal. If, for example, the phase error exceeds from one data symbol to a next successive data symbol a value that is greater than half of the separation angle, then the next successive data symbol derived by differential decoding and by a hard decision detection scheme is erroneous. If further on, the phase error remains to be greater than the mentioned value, then further successive data symbols derived by differential decoding and by hard decision detection are correct. Thus, differential coding helps to reduce the impact of phase errors caused by a transmission channel in case of a hard decision detection scheme.

SUMMARY

It is an objective of the proposed method, to improve the known method of optical data transmission. Proposed is a method of decoding optical data signals. The method comprises different steps.

A differentially encoded phase-shift keying modulated optical signal is received from an optical transmission channel. A phase offset caused by the optical transmission channel is estimated. The phase of the received differentially encoded PSK modulated optical signal is corrected by the estimated phase offset.

Differentially decoded data values are derived from the corrected optical signal, using an estimation algorithm. The estimation algorithm accounts for a differential encoding rule of the differentially encoded phase-shift keying modulated optical signal, is suitable to maximise a probability with respect to potentially transmitted differentially encoded data symbols or to maximise one or more probabilities with respect to the differentially decoded data values, and stipulates transition probabilities between first hypothetical states, representing potentially transmitted differentially encoded data symbols assuming that no phase slip has occurred, and second hypothetical states, representing potentially transmitted differentially encoded data symbols assuming that a phase slip has occurred.

The transition probabilities between the first and the second states are weighted on the basis of a predetermined phase slip probability value.

In order to appreciate the advantages of the proposed method, the following aspects have to be considered:

When transmitting an optical signal over an optical transmission channel, the phase may be degraded by the optical transmission channel by a phase offset. When estimating the phase offset and then correcting the phase of the PSK modulated optical signal by the estimated phase offset, there is a risk that the estimated phase offset may be erroneous to a degree, such that the correction of the received optical signal by the estimated phase offset can be interpreted as a rotation of the PSK constellation diagram by a whole numbered multiple of the separation angle. In other words, this rotation of the PSK constellation diagram can be caused by the combination of the phase-offset of the optical channel and a correction of the received optical signal by a falsly estimated phase offset. If such a rotation of the constellation diagram occurs from one data symbol to a next successive data symbol, this is called a phase slip. In even other words, a phase slip is caused by an optical transmission channel in combination with a phase correction using an estimated phase offset value. A typical value for a probability of a phase slip of an optical channel in combination with a phase offset correction algorithm is for example $10^{-3}$.

A phase slip leads to false received differentially encoded data symbols for the time instance of the phase slip occurance and for further successive time instance after the phase slip. But, by applying differential decoding, the differentially decoded data symbol for the time instance of the phase slip occurance is erroneous, while further successive differentially decoded data symbols are correct. Thus, a phase slip leads also to false received differentially decoded data values that are represented by the differentially decoded data symbol at the time instance of the phase slip occurance.

The proposed method has the advantage, that the possibility of a phase slip occurance is taken into account for deriving differentially decoded data values. If only the first states representing potentially transmitted differentially encoded data symbols in case of no phase slip were stipulated, then the estimation algorithm would be limited to a solution, in which a modification of the differentially encoded data symbols due to a phase slip could not be accounted for. But, by stipulating also the second states representing potentially transmitted differentially encoded data symbols in case of a phase slip, and by weighting the transitions probabilities between the first and the second states based on a predetermined phase slip probability value, the algorithm is able to account for a modification of the potentially transmitted differentially encoded data symbols due to a phase slip. This in turn allows a more reliable derivation of the differentially decoded data values, which in turn allows to achieve a reduced error rate.

The proposed method has furthermore the advantage, that instead of directly applying a hard-decision detection scheme, an estimation algorithm, which maximizes one or more probabilities, is used for deriving a sequence of differentially decoded data values. This allows for a more reliable derivation of received data values.

BRIEF DESCRIPTION OF THE FIGURES

FIG. 6 shows further states and further state transitions of the estimation algorithm.

DESCRIPTION OF EMBODIMENTS

Figure 1:
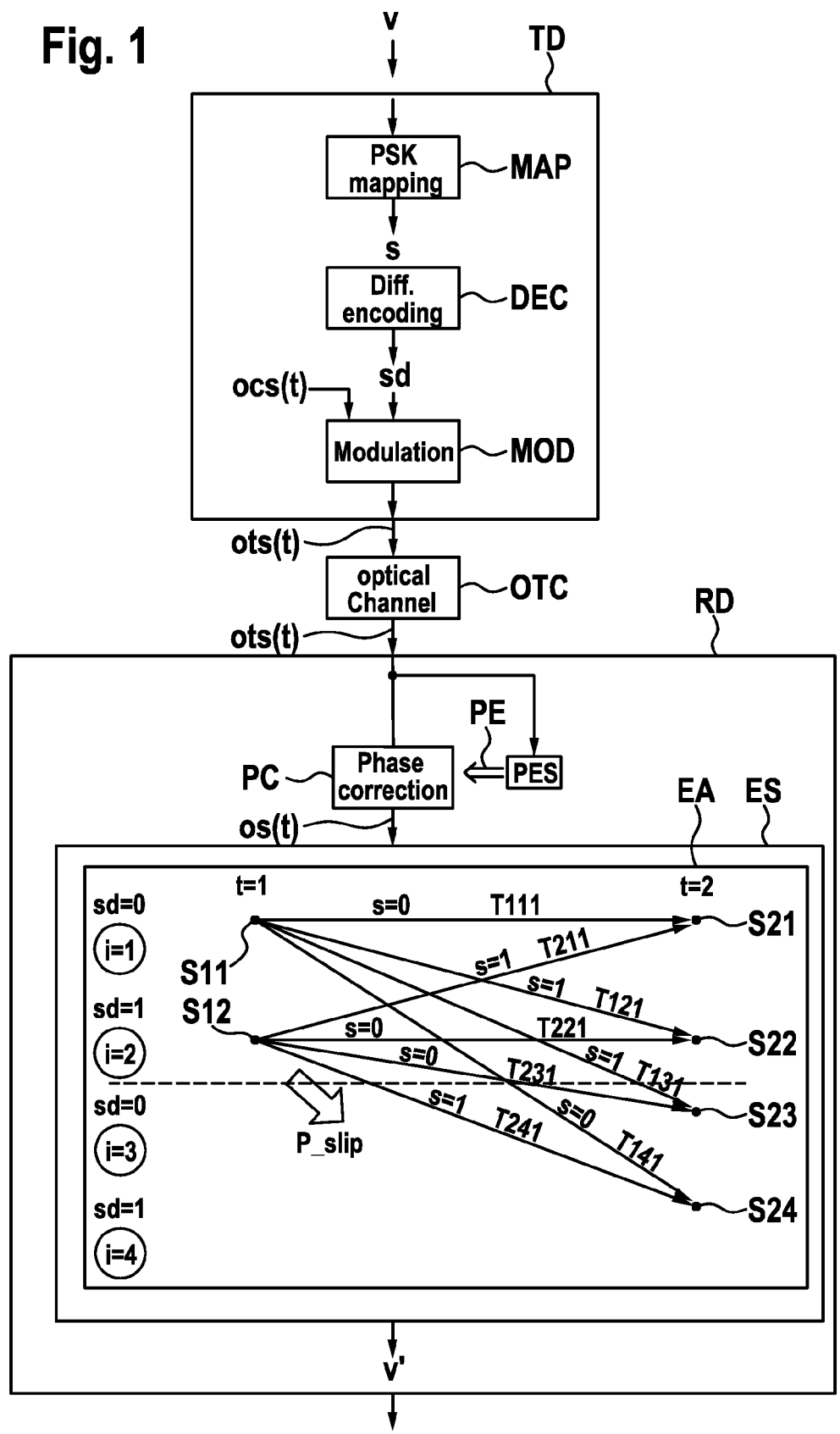
FIG. 1 shows block diagrams of transmission device and a receiving device.

FIG. 1 shows a transmission device TD. The transmission device TD receives a sequence v of data values as $v=[v(1), \ldots, v(K)]$, with index $k=1 \ldots K$.

In a mapping step MAP, sets of L consecutive data values are mapped onto a data symbol s(m) of a PSK constellation diagram, which yields a sequence s of data symbols as $s=[s(1), \ldots, s(M)]$, with index $m=1, \ldots, M$, wherein $M=K/L$.

Each data symbol s(m) represents a sub-sequence of data values as $s(m)=[v(L(m-1)+1), \ldots, v(Lm)]$.

In a differential encoding step DEC, the sequence of data symbols s is differentially encoded into a sequence sd of differentially encoded data symbols as $sd=[sd(1), \ldots, sd(M)]$, with index $m=1, \ldots, M$.

The sequence sd of differentially encoded data symbols represents a sequence vd of differentially encoded data values as $vd=[vd(1), \ldots, vd(K)]$, with index $k=1 \ldots K$.

Each differentially encoded data symbol sd(m) represents a sub-sequence of differentially encoded data values vd(k) as $sd(m)=[vd(L(m-1)+1), \ldots, vd(Lm)]$.

The possible values of the differentially encoded data symbols sd(m) are represented by constellation points of the PSK constellation diagram used for the optical data transmission, as it will explained in detail further below.

In a modulation step MOD, the transmission device TD generates an optical transmission signal ots(t), by modulating the phase of an optical carrier signal ocs(t) in dependence on the differentially encoded data symbols sd and in accordance with the PSK constellation diagram. The phase of the signal ocs(t) is modulated, such that it corresponds to the symbol phase values of the constellation points representing the differentially encoded data symbols sd.

The differentially encoded phase modulated optical signal ots(t) is transmitted over an optical transmission channel OTC. During the transmission, the optical transmission signal ots(t) may be subject to phase changes caused by the optical transmission channel OTC.

The transmitted signal ots(t) is received at a receiving device RD. From the received signal ots(t), a phase error PE is estimated in a phase estimation step PES. The phase of the received signal ots(t) is corrected by the estimated phase error PE in a phase correction step PC, which yields a corrected optical signal os(t). The corrected optical signal os(t) is possibly subject to a phase slip.

Figure 2A:
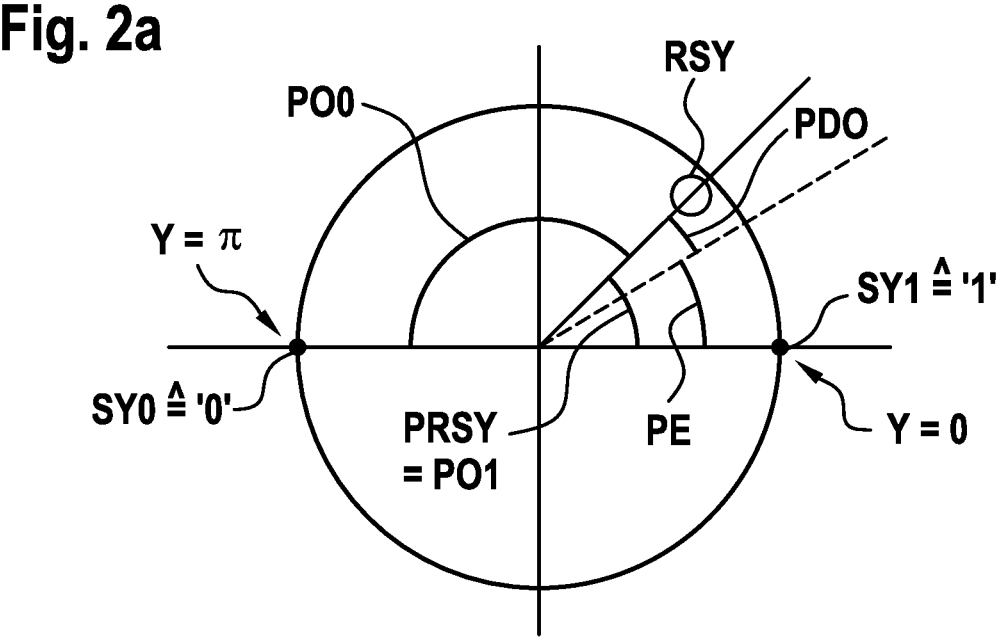
FIGS. 2a, 2b, 2c and 2d show phase values on PSK constellation diagrams.

The effect of a phase slip is explained in detail with regards to the FIGS. 2a, 2b, 2c and 2d. FIG. 2a shows a BPSK constellation diagram CD, in which a constellation point SY0 with the phase value of r represents a data symbol '0', and in which a constellation point SY1 with the phase value of 0 represents a data symbol '1'. The absolute value of the separation angle, which separates the adjacent constellation points, is π. As an example, the phase and the amplitude of the received optical signal may be such, that they correspond to a received data symbol RSY, indicated as a circle in FIG. 2a and representing a phase value of PRSY.

Figure 2B:
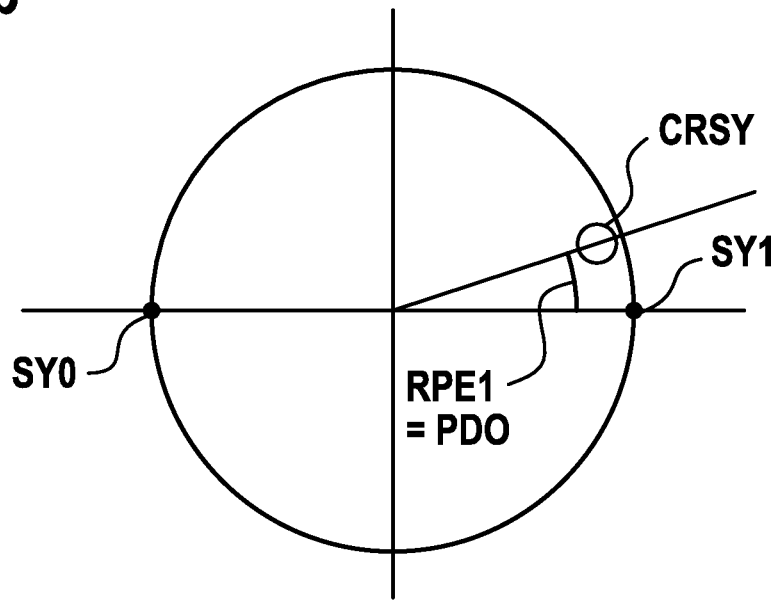

For the case that a data symbol SY1 equal to '1' was transmitted, the phase offset PO1 caused by the optical transmission channel is equal to the phase value of PRSY. The phase offset may for example be estimated to a value PE that is almost equal to the phase value PRSY. The phase difference PDO is the absolute error between the estimated phase offset PE and the actual phase offset PO1 in this case. The result of a phase correction by the estimated phase offset PE in the case that a symbol SY1 was transmitted is shown in FIG. 2b. The corrected phase of the corrected symbol CRSY differs from the phase value of the data symbol SY1 only by a remaining phase error RPE1, which is equal to the absolute value of the estimation error PDO. The corrected phase value CRSY may later on be used, for reliably detecting a transmission of the data symbol SY1.

But, it may also be the case, that a data symbol of SY0 equal to '0' was actually transmitted, in which case the phase offset PO0, shown in FIG. 2a, was caused by the optical transmission channel. If also in this case, due to estimation errors, the estimated phase offset is estimated to be equal to the value PE, then there is a great difference between the estimated phase offset PE and the actual phase offset PO0 caused by the transmission channel.

Figure 2C:
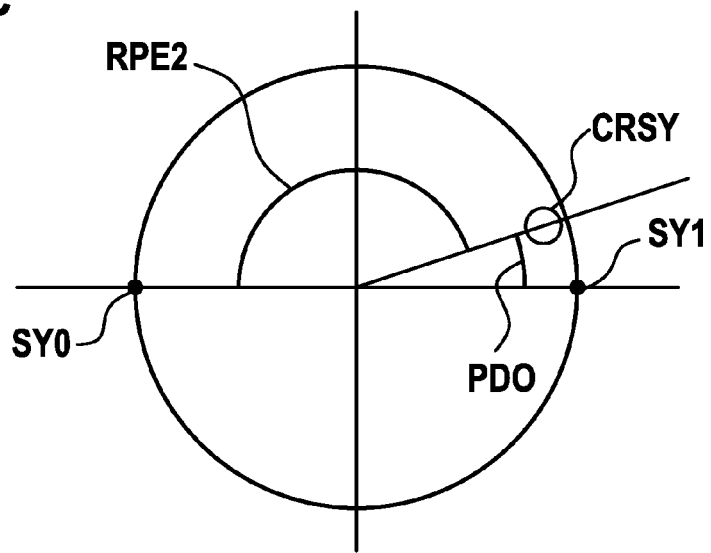
Figure 2D:
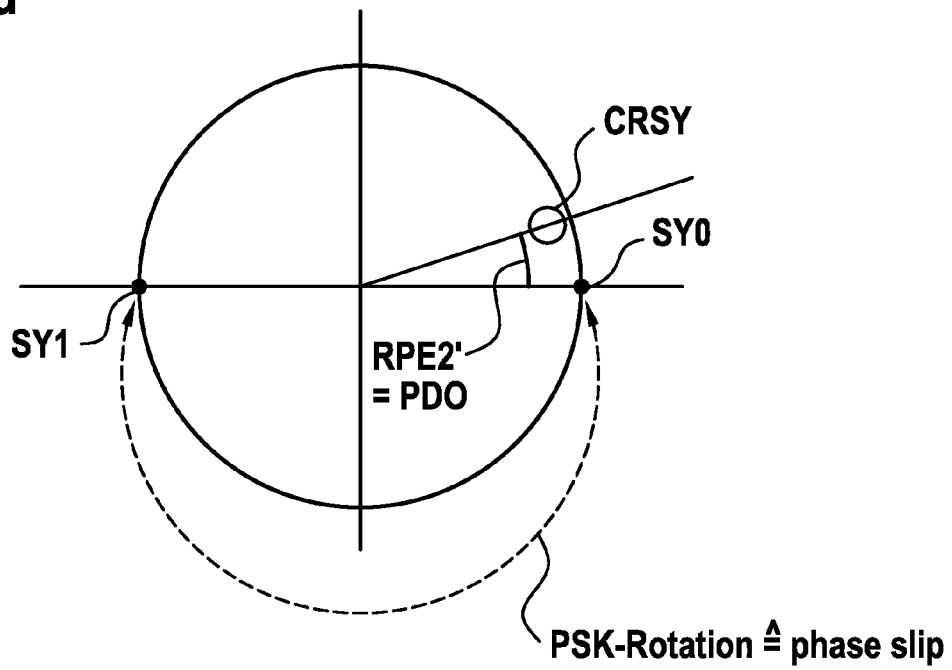

FIG. 2c shows the result of a phase correction by the estimated phase offset PE for the case that a symbol SY0 was transmitted. Such a correction leads also in this case to the corrected received symbol phase value CRSY. The remaining phase error RPE2 is in this case equal to the value of π minus the phase difference PDO. As it is evident from FIG. 2c, in this case, the corrected received symbol phase value CRSY can not be used reliably to detect a transmission of the actually transmitted symbol SY0 if no further assumptions are made. But if, as shown in FIG. 2d, an occurance of a phase slip causing a rotation of the constellation diagram by the separation angle π is assumed, then the corrected received symbol phase value CRSY differs from the transmitted symbol SY0 only by a remaining phase error RPE2', which is equal to the value of the phase difference PDO. Thus, by allowing for the possibility of a rotation of the constellation diagram due to a phase slip, a higher reliability of detected data symbols and thus also derived data values can be achieved.

Coming back to FIG. 1, differentially decoded data values $$v'=[v'(1), \ldots, v'(K)], \text{ with index } k=1 \ldots K,$$

are derived from the corrected optical signal os(t) within an estimation step ES, using an estimation algorithm EA. The estimation algorithm EA is an estimation algorithm that accounts for the differential encoding rule used for generating the differentially encoded phase-shift keying modulated optical signal ots(t) on the transmission side.

The estimation algorithm EA stipulates for each time instance with the index t different states Sti, wherein i is the state index. For the example of a BPSK constellation diagram, the state index values i=1, 2, 3, 4 are indicated on the left hand side of the estimation algorithm EA. For a PSK constellation diagram with N constellation points, the number of states that are stipulated is equal to $N^2$.

The estimation algorithm EA stipulates for a time instance t with the index t=1 a hypothetical state S11, which represents a potentially transmitted differentially encoded data symbol sd(t=1) of '0', and a hypothetical state S12, which represents a potentially transmitted differentially encoded data symbol sd(t=1) of '1'. For both states S11 and S12, it is assumed that no phase slip has yet occurred.

The algorithm EA stipulates also for a time instance t with the index t=2 a hypothetical state S21, which represents a potentially transmitted differentially encoded data symbol sd(t=2) of '0', and a hypothetical state S22, which represents a potentially transmitted differentially encoded data symbol sd(t=2) of '1'. For both states S21 and S22, it is assumed that no phase slip has yet occurred from the time instance t=1 to the time instance t=2.

Furthermore, the algorithm EA stipulates for the time instance t=2 a state S23, which represents a potentially transmitted differentially encoded data symbol sd(t=2) of '0', and a hypothetical state S24, which represents a potentially transmitted differentially encoded data symbol sd(t=2) of '1'. For both states S23 and S24, it is assumed that a phase slip has occurred from the time instance t=1 to the time instance t=2.

Furthermore, transitions T111, ..., T241 are stipulated. A transition Tijt has an index ijt, which indicates the i-th state from which the transition starts, the j-th state to which the transition leads, and the time index t, at which the transition starts.

Transitions T111, T121, T211, T221 between the states S11, S12, S21, S22 are stipulated, which assume that no phase slip has occurred. To each transition T111, T121, T211, T221, leading from the states S11, S12 to the states S21, S22 in the case of no phase slip, a respective differentially decoded data symbol s(t=2) is associated; by this, the algorithm accounts for a differential encoding rule used on the transmission side. For the transitions T111, T121, T211, T221, respective transition probabilities are derived from amplitude values of the received optical signal, as it will be described in detail later on.

Furthermore, transitions T131, T231, T141, T241 between the states S11, S12, S23, S24 are stipulated, which occur in the case that a phase slip has occurred. To each transition T131, T231, T141, T241, leading from the states S11, S12 to the states S22, S23 in the case that a phase slip occurred, a differentially decoded data symbol s(t=2) is associated; by this, the algorithm accounts for a differential encoding rule used on the transmission side. For the transitions T111, T121, T211, T221, respective transition probabilities are derived from amplitude values of the received optical signal, as it will be described in detail later on.

The transition probabilities of the transitions T131, T231, T141, T241, which run between the states S11, S12 and the states S23, S24 in the case of a phase slip, are weighted using a predetermined phase slip probability value P_slip.

Further states representing differentially encoded data symbols in the case of no phase slip and in the case of a phase slip may be stipulated for further time instances t=3, 4, ..., which are not depicted in FIG. 1.

Using the stipulated states and the stipulated transition probabilities, the algorithm EA can be used for deriving a sequence of differentially decoded data values v'.

The algorithm EA may be an algorithm that is suitable to maximise a probability with respect to a sequence of potentially transmitted differentially encoded data symbols. Alternatively, the algorithm EA may be an algorithm that is suitable achieve a maximisation respective probabilities with respect to the derived differentially decoded data values; for this maximization additional steps in addition to the algorithm may be carried out. These options for the algorithm EA will be described later on in detail.

Figure 3:
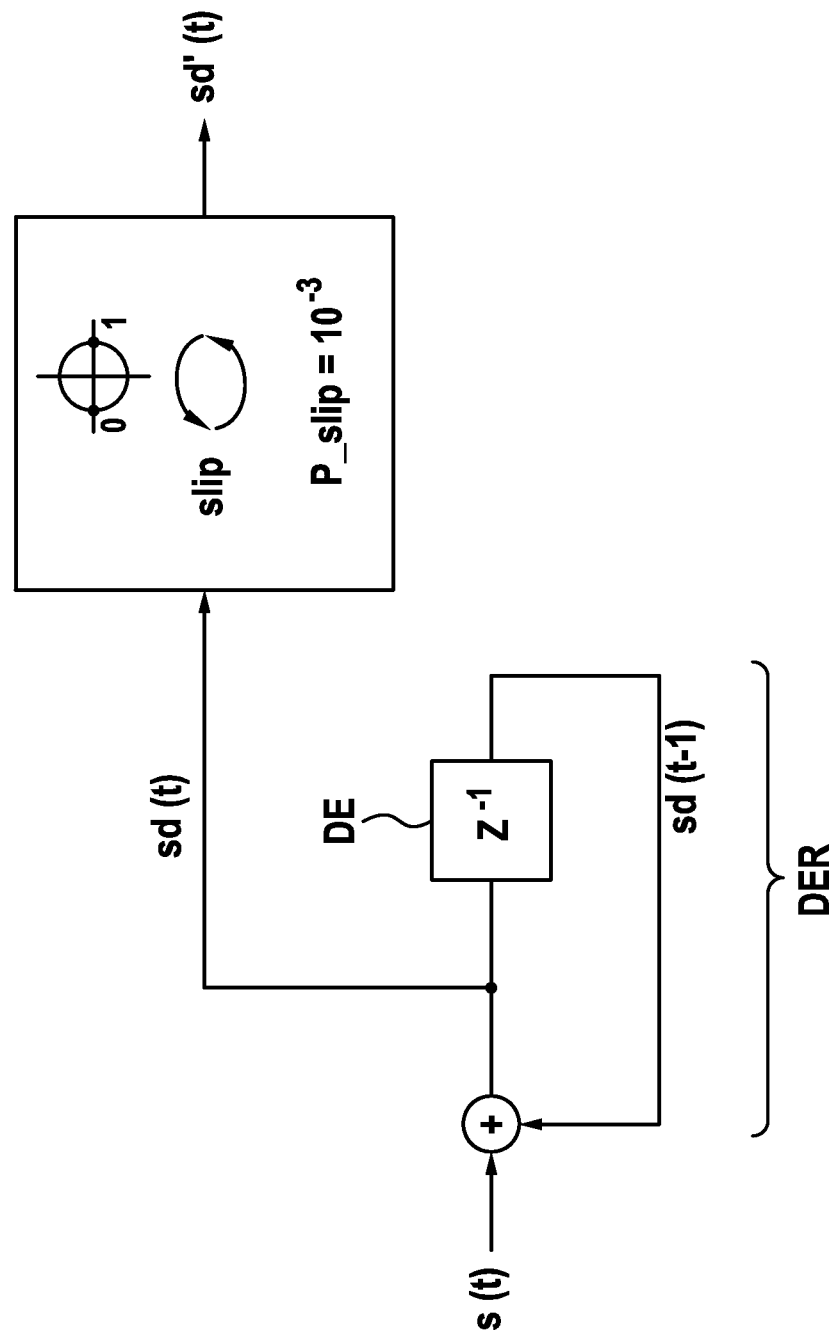
FIG. 3 shows a transmission model.

FIG. 3 shows a block diagram BD that illustrates a model which is taken as a basis for defining the stipulated states and the stipulated state transition probabilities. The model includes a differential encoding rule DER for differentially encoding time discrete data symbols s(t) at the transmission side, as well as a possible phase slip PS with a phase slip probability P_slip caused by a phase compensation at the receiver. This illustration is given for the example of BPSK.

Differentially encoded data symbols sd(t) are derived, using a linear feedback shift register which contains a delay element DE. The derived differentially encoded data symbols sd(t) satisfy the equation $$sd(t)=s(t)\oplus sd(t-1),$$

wherein the addition $\oplus$ indicates a modulo addition. For BPSK, the data symbols s(t) are equal to the data values v(t), and the differentially encoded data symbols s(t) are equal to the differentially encoded data values vd(t).

The possible phase slip PS is modelled as a rotation of the constellation diagram by the separation angle of the constellation diagram. The phase slip has a predetermined phase slip probability P_slip, which may be set to a value of $10^{-3}$ for example. For BPSK, the separation angle is $\pi$, therefore a rotation of the BPSK constellation diagram is equal to an exchange of the symbol values '0' and '1', which is equal to a bit inversion of the differentially encoded data symbol sd(t) at the occurance of the phase slip. For BPSK, this is also equal to a bit inversion of the differentially encoded data value vd(t).

The potentially affected differentially encoded data symbols resulting from a possible phase slip are given as sd'(t); for BPSK the potentially affected differentially encoded data values vd'(t) are equal to the potentially affected differentially encoded data symbols sd'(t).

If no phase slip occurs, then the potentially affected differentially encoded data symbols sd'(t) are equal to the potentially transmitted differentially encoded data symbols sd(t) provided by the differential encoding rule DER. If no phase slip occurs, and if no further transmission distortion occurs, then the potentially affected differentially encoded data symbols sd'(t) are equal to the potentially transmitted differentially encoded data symbols sd(t).

Figure 4:
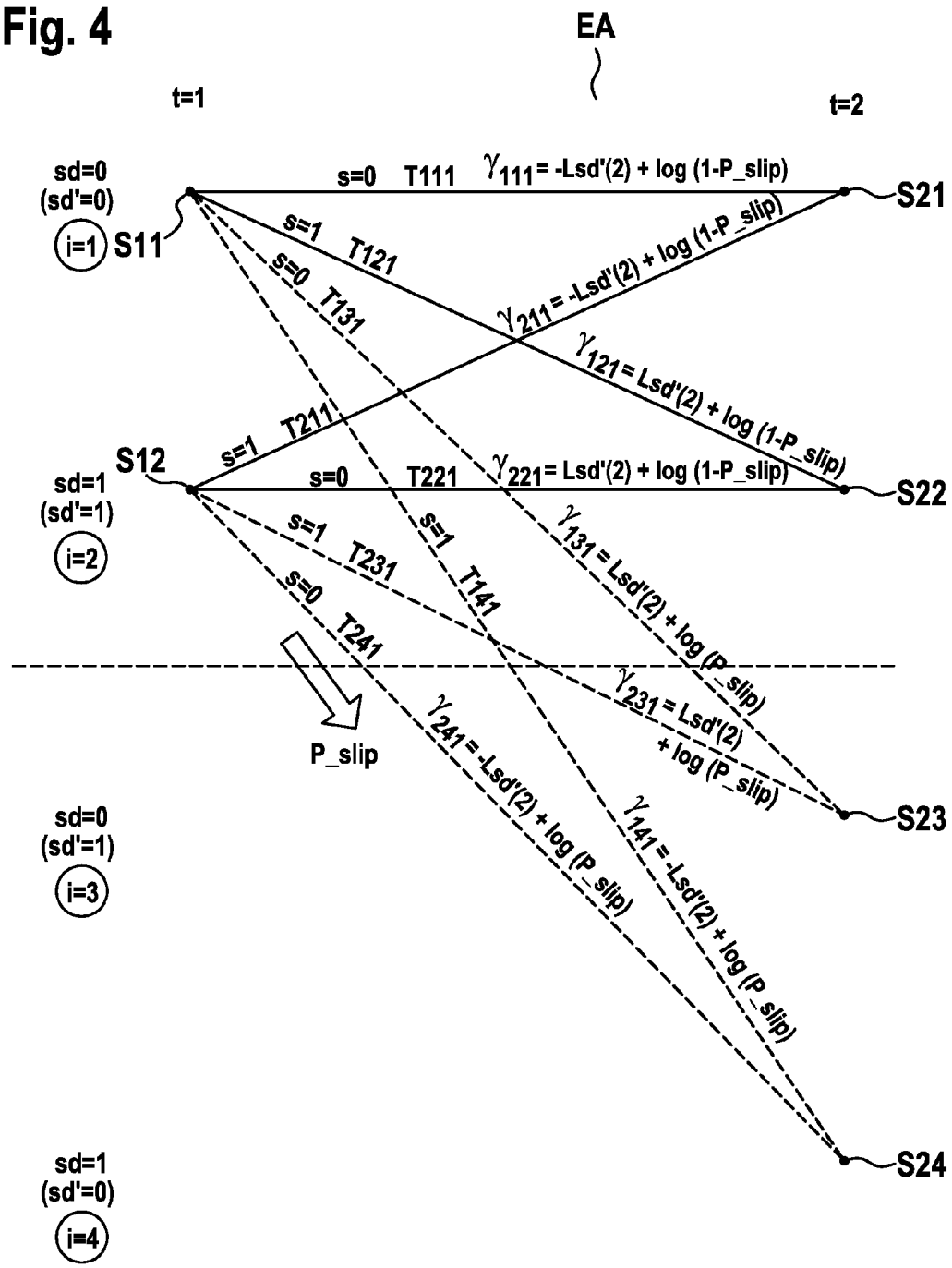
FIG. 4 shows states and state transitions of an estimation algorithm.

FIG. 4 shows the estimation algorithm EA together with the states S11, ..., S24 and the transitions T111, ..., T241 already shown in FIG. 1 in more detail.

It is now explained in detail, in which way the estimation algorithm EA accounts for the differential encoding rule. As previously stated, the states S11, ..., S24 represent corresponding differentially encoded data symbols sd(t) that were potentially transmitted.

Differentially encoded data symbols sd'(t) equal to the potentially transmitted differentially encoded data symbols sd(t) are associated to the states S11, S12, S21, S22, since for these states S11, S12, S21, S22 it is assumed that no phase slip occured.

The states S23, S24 represent differentially encoded data symbols sd(t) in the case of a phase slip. Thus, to these states S23, S24, corresponding potentially affected differentially encoded data symbols sd'(t) are associated, which are unequal to the associated differentially encoded data symbols sd(t).

It shall be assumed, that at the time instance t=1, the differential encoder DER of FIG. 3 is in a state of sd(t=1)=0.

If the next successive data symbol s(t=2) is equal to '0', and if no phase slip occurs, then the differential encoder DER transits to a state of sd(t=2)=0, which is represented by the state S21. The next successive data symbol s(t=2)=0 as a differentially decoded data symbol is associated with the corresponding state transition T111.

If the next successive data value s(t=2) is equal to '1', and if no phase slip occurs, then the differential encoder DER transits to a state of sd(t=2)=1, which is represented by the state S22. The next successive data symbol s(t=2)=1 as a differentially decoded data symbol is associated with the corresponding state transition T121.

If the next successive data symbol s(t=2) is equal to '0', and if a phase slip occurs, then the differential encoder DER transits to a state of sd(t=2)=0. This is represented by the state S23, which also is associated with a potentially affected differentially encoded data symbol of sd'(t=2)=1. The next successive data symbol s(t=2)=0 as a differentially decoded data symbol is associated with the corresponding state transition T131.

If the next successive data symbol s(t=2) is equal to '1', and if a phase slip occurs, then the differential encoder DER transits to a state of sd(t=2)=1. This is represented by the state S24, which also is associated with a potentially affected differentially encoded data symbol of sd'(t=2)=0. The next successive data symbol s(t=2)=1 as a differentially decoded data symbol is associated with the corresponding state transition T141.

It has been explained above in detail for the case that the differentially encoded data symbol is sd(t=1)=0, in which way differentially decoded data symbols s(t) are represented by the state transitions T111, T121 in the case of no phase slip, and in which way differentially decoded data symbols s(t) are represented by the state transitions T131, T141 in the case of a phase slip. For the case that the differentially encoded data symbol at the time t=1 is sd(t=1)=1, differentially decoded data symbols s(t=2) in case of no phase slip are represented by the state transitions T211, T221, while differentially decoded data symbols s(t=2) in case of a phase slip are represented by the state transitions T141, T241.

The state transitions T111, ..., T241, that represent differentially decoded data symbols s(t), have corresponding transition probabilities $\gamma_{111}, \ldots, \gamma_{241}$. In this example, the transition probabilities $\gamma_{111}, \ldots, \gamma_{241}$ are given in the logarithmic domain; this does not necessarily have to be the case, they might instead be given in the linear domain. The transition probabilities $\gamma_{111}, \ldots, \gamma_{241}$ are initialized using a probability value Lsd'(t=2), which is derived from the received optical signal at the time t=2 as a logarithmic value. For normalization reasons, a probability value Lsd' may be multiplied by a factor $$\frac{1}{N},$$

wherein N is the number of constellation points of the PSK constellation diagram.

The probability value Lsd'(t=2) is derived from the optical signal at the time t=2 and indicates a probability, whether a potentially affected differentially decoded data symbol sd'(t) is equal to '0' or equal to '1'. If the probability is high that the potentially affected differentially encoded data symbol sd'(t) is equal to '1', then the value Lsd'(t=2) takes on large positive values. If the probability is high that the potentially affected differentially encoded data value sd'(t) is equal to '0', then the value Lsd'(t=2) takes on large negative values. In which way the value Lsd'(t=2) can be derived from the received optical signal will be described in detail later on with regard to the FIGS. 5a, 5b and 5c.

The transition probability $\gamma_{111}$ shall indicate the probability of a transition from the state S11 to the state S21. The state S11 represents a transmitted differentially encoded data symbol of sd(t=1)=0. The state S21 represents an assumed transmitted differentially encoded data symbol of sd(t=2)=0 and also a potentially affected differentially encoded data symbol sd'(t=2)=0 in the case of no phase slip. Using the probability value Lsd'(t=2), the transition probability $\gamma_{111}$ is initialized. In the case, that the probability is high that the potentially affected differentially encoded data symbol sd'(t=2) is equal to zero as sd'(t=2)=0, then the probability value Lsd'(t=2) takes on a large negative value. Therefore, the transition probability $\gamma_{111}$ is initialized with the probability value Lsd'(t=2) multiplied by −1.

The transition probability $\gamma_{121}$ shall indicate the probability of a transition from the state S11 to the state S22. The state S11 represents a transmitted differentially encoded data symbol of sd(t=1)=0. The state S22 represents an assumed transmitted differentially encoded data symbol of sd(t=2)=1 and also a potentially affected differentially encoded data symbol sd'(t=2)=1 in the case of no phase slip. Using the probability value Lsd'(t=2), the transition probability $\gamma_{111}$ is initialized. In the case, that the probability is high that the potentially affected differentially encoded data symbol sd'(t=2) is equal to one as sd'(t=2)=1, then the probability value Lsd'(t=2) takes on a large positive value. Therefore, the transition probability $\gamma_{111}$ is initialized with the probability value Lsd'(t=2) multiplied by +1.

The further transition probabilities $\gamma_{211}, \gamma_{221}, \gamma_{131}, \gamma_{141}, \gamma_{231}, \gamma_{241}$ of the transitions T211, T221, T131, T141, T231, T241 are initialized in an analogue way using the probability value Lsd'(t=2). The sign used for this initialization is chosen to + or −, in dependence on the assumed transmitted differentially encoded data symbols sd(t=2) and the potentially affected differentially decoded data symbol sd'(t=2) represented by the state, to which the respective transition T211, T221, T131, T141, T231, T241 leads.

The transition probabilities $\gamma_{131}, \gamma_{141}, \gamma_{141}, \gamma_{241}$ of the state transitions T131, T231, T141, T241, that represent differentially decoded data symbols s(t) at the time t=2 in the case of a phase slip, are weighted using a predetermined phase slip probability P_slip. This weighting is performed, by adding to the transitions probabilities $\gamma_{131}, \gamma_{141}, \gamma_{141}, \gamma_{241}$ the logarithmic term log(P_slip).

For the sake of clarity, in the examples given in this application, the logarithm noted as log shall indicate a natural logarithm with the basis e. This is a non-limiting example.

Preferably, for normalization reasons, the transition probabilities $\gamma_{111}, \gamma_{121}, \gamma_{211}, \gamma_{221}$ of the state transitions T111, T121, T211, T221 that represent differentially decoded data symbols s(t) in the case of no phase slip are weighted using the predetermined phase slip probability P_slip. This weighting is performed, by adding to the transitions probabilities 65$_{111}$, $\gamma_{121}, \gamma_{211}, \gamma_{221}$ a normalization term, which is the logarithmic term log(1−P_slip).

With regard to the FIGS. 5a, 5b and 5c, it will now be explained in detail, in which way the probability value Lsd' (t=2), which indicates a probability whether a potentially affected differentially decoded data symbol is equal to '0' or equal to '1' at t=2, can be derived from the received optical signal.

Figure 5A:
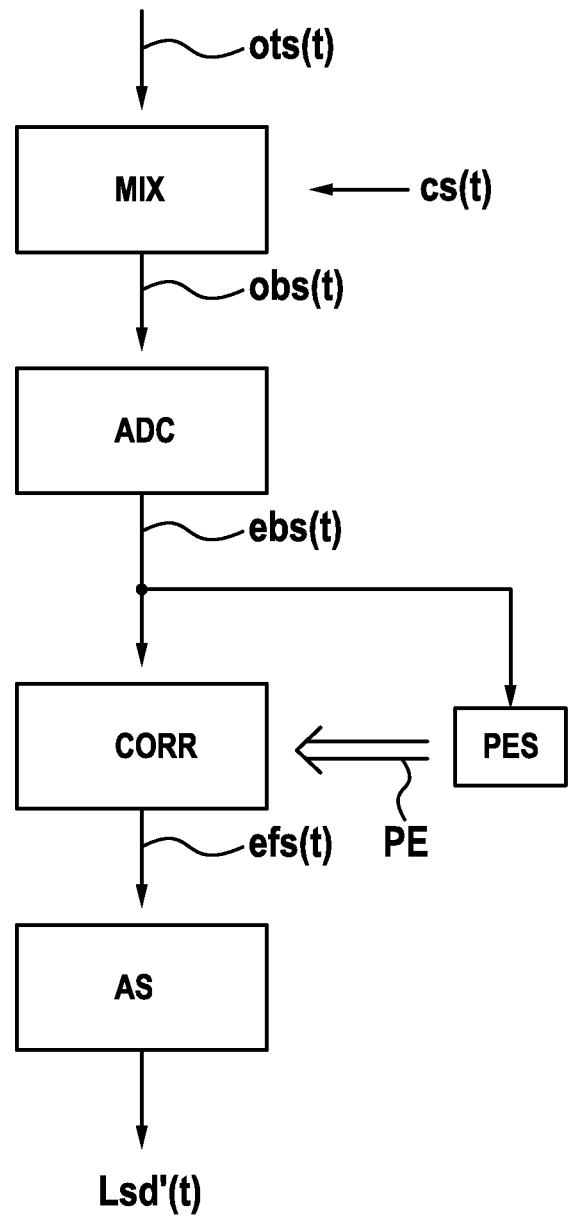
FIG. 5a shows steps of a method for deriving probability values.

FIG. 5a shows steps of a method for deriving from the received optical signal ots(t) one or more probability values Lsd'(t). The received optical signal ots(t) is mixed in a mixing step MIX with an optical phase-coherent carrier signal cs(t), that possesses essentially the carrier frequency. The phase $\phi_{CS}$ of the optical phase-coherent carrier signal cs(t) is equal to the phase $\phi_{OCS}$ of the optical carrier signal used at the transmitting side plus/minus a whole numbered multiple of the PSK separation angle $\phi_{SEP-PSK}$ as $$\phi_{CS}=\phi_{OCS}\pm N\cdot\phi_{SEP-PSK}, \text{ with } N=0,1,2,\ldots.$$

This mixing yields a resulting optical baseband signal obs (t). The optical baseband signal obs(t) is converted to a sampled electrical signal ebs(t) via analogue-digital conversion ADC. In a phase offset estimation step PES, a phase offset PE caused by the transmission channel is estimated from the sampled electrical signal ebs(t). This estimated phase offset PE is provided to a phase correction step CORR. In the phase correction step CORR, the phase of the sampled electrical signal ebs(t) is modified by the estimated phase offset PE. The resulting electrical filtered signal efs(t) is then used in an analysis step AS for deriving one or more probability values Lsd'.

Figure 5B:
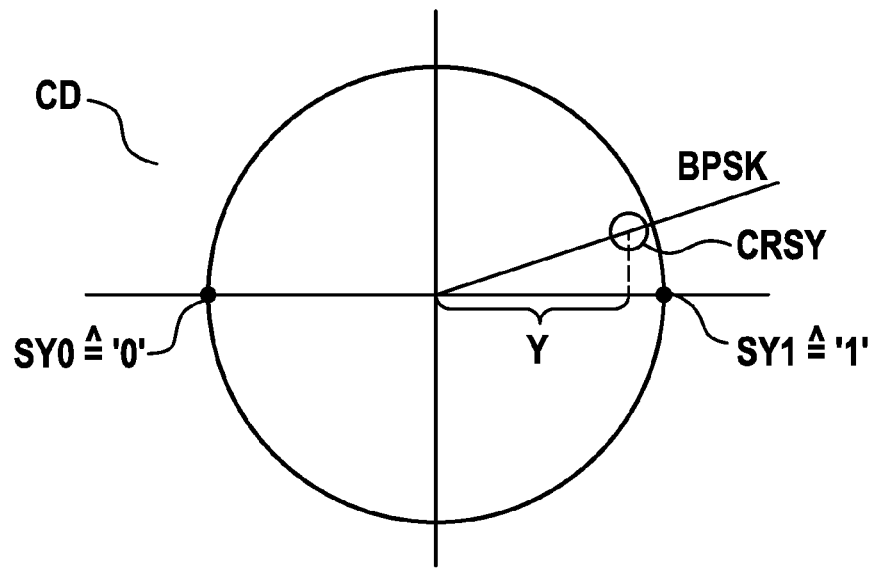
FIG. 5b shows a received data symbol on a BPSK constellation diagram.

FIG. 5b shows a PSK constellation diagram CD, in this example for BPSK modulation scheme. The constellation point SY1 at the phase position $\phi$=0 represents a differentially encoded data symbol of the value sd=1. The constellation point SY1 at the phase position $\phi$=0 is equal to a signal amplitude of +1. The constellation point SY0 at the phase position $\phi$=π represents a differentially encoded data symbol of the value sd=0. The constellation point SY0 at the phase position $\phi$=π is equal to a signal amplitude of −1.

As a non-limiting example, it shall be assumed, that a corrected received symbol value CRSY is derived from the electrical filtered signal efs(t) for the time instance t=2. It is assumed, that the transmission channel in combination with the phase correction causes not only a transmission distortion that may result in a phase slip, but also a deviation of corrected received symbol values CRSY from the constellation points SY0, SY1 due to a transmission distortion in the form of an additive average white Gaussian noise (AWGN) signal.

A probability value shall be determined, which shall indicate whether the received differentially encoded data symbol sd(t=2) is equal to a '0' or to a '1'. For this, the log-likelihood ratio $$Lsd'(t) = \ln\frac{P(sd'(t) = 1)}{P(sd'(t) = 0)}$$

is calculated as a probability value in the logarithmic domain. Herein, P(sd'(t)=1) is the probability, that sd' is equal to '1', while P(sd'(t)=0) is the probability that sd' is equal to '0'.

It can be shown, that for the assumption of an additive AWGN noise signal with a variance of $\sigma_N^2$, the log-likelihood ratio Lsd'(t) can be easily determined as $$Lsd'(t) = \ln\frac{P(sd'(t) = 1)}{P(sd'(t) = 0)} = \frac{2}{\sigma_N^2} \cdot y,$$

wherein y is the amplitude of the corrected received symbol CRSY on the real axis along which the constellation points SY0 and SY1 are placed. The variance $\sigma_N^2$ of the assumed AWGN noise is provided as a predetermined value.

Figure 5C:
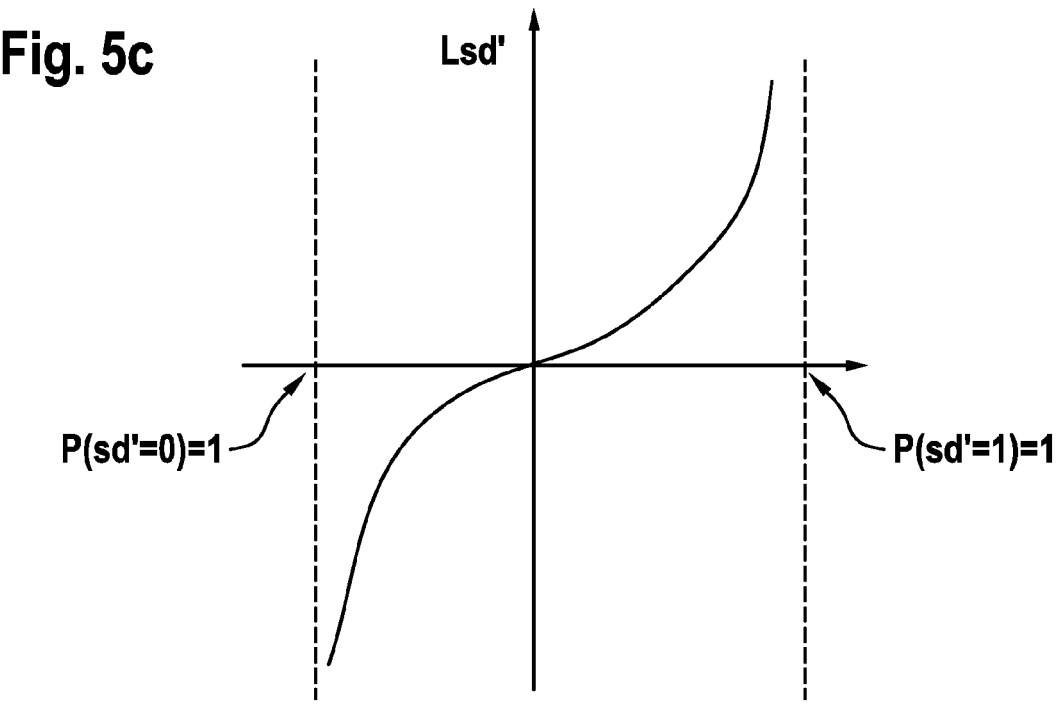
FIG. 5c shows a value range of a probability value.

FIG. 5c shows a graph of possible values for Lsd'(t) in relation to the probabilities P(sd'(t)=0)=1 and P(sd'(t)=1)=1. It is evident, that for a high probability of P(sd'(t)=1), the probability value Lsd'(t) takes on large positive values, while for a high probability of P(sd'(t)=0), the probability value Lsd'(t) takes on large negative values.

It has been shown in detail, in which way a probability value Lsd'(t=2) can be derived from corrected received symbol values CRSY for the time instance of t=2. The corrected received symbol values CRSY were obtained, by phase coherent mixing of the received optical signal and phase correction by an estimated phase offset. By obtaining further corrected received symbol values for further time instances, probability values Lsd'(t) can be derived, which indicate for the respective time instances whether the received differentially encoded symbol sd'(t) is equal to '1' or '0'.

Coming back to FIG. 5a, the step PES of estimating the phase offset PE may be carried out, relying on the method proposed in "Viterbi, A. J., and Viterbi, A. M.: *'Nonlinear estimation of PSK-modulated carrier phase with application to burst digital transmission', IEEE Transaction on Information Theory*, 1983, 29, pp. 543-551", or alternatively relying on the method proposed in "Pfau, T. ; Hoffmann, S.; Noe, R.; *"Hardware-Efficient Coherent Digital Receiver Concept With Feedforward Carrier Recovery for M-QAM Constellations" Journal of Lightwave Technology*, Vol. 27 pp. 989-999, 2009".

Furthermore, in the case that the frequency of the optical carrier signal used on the transmission side may deviate from the frequency of the optical signal cs(t) used for coherent mixing MIX, a frequency offset can be estimated from the received optical signal ots(t) in a step of frequency offset estimation, not shown explicitly in FIG. 5a. This frequency of the carrier signal cs(t) may then be changed by the estimated frequency offset in a step of frequency compensation, not shown explicitly in FIG. 5a. An estimation of the frequency offset may be carried out according to the method proposed in "Andreas Leven, Noriaki Kaneda, Ut-Va Koc, and Young-Kai Chen, *'Frequency Estimation in Intradyne Reception' Photonics Technology Letters*, IEEE, vol. 19, 2007, pp. 366-368", alternatively by relying on the method proposed in "A. D'Amico, A. D'Andrea, and R. Regiannini, *'Efficient non-data-aided carrier and clock recovery for satellite DVB at very low signal-to-noise ratios' Selected Areas in Communications*, IEEE Journal on, vol. 19, 2001, pp. 2320-2330"

It has been described in detail with regard to FIG. 4, how to stipulate states and transition probabilities for the time instances t=1 and t=2, in order to model assumed transmitted differentially encoded data symbols sd(t=2) and received potentially affected differentially decoded data symbol sd' (t=2) in case of no phase slip and in case of a phase slip.

It has been outlined in detail, how to stipulate states S21, S22, that represent potentially transmitted differentially encoded data symbols sd(t) for t=2 assuming that no phase slip has occurred, and further states states S23, S24, that represent potentially transmitted differentially encoded data symbols sd(t) for t=2 assuming that a phase slip has occurred.

It has been outlined furthermore in detail, how to stipulate the transition probabilities $\gamma_{111}$, $\gamma_{121}$, $\gamma_{211}$, $\gamma_{221}$ of the transitions T111, T121, T211, T221 from the states S11, S12 to the states S21, S22 for assuming that no phase slip has occurred. A determination of the values of these transition probabilities $\gamma_{111}$, $\gamma_{121}$, $\gamma_{211}$, $\gamma_{221}$ in dependence on a derived probability value Lsd'(t=2) and a predetermined phase slip probability P_slip has also been outlined.

It has been outlined furthermore in detail, how to stipulate the transition probabilities $\gamma_{131}$, $\gamma_{141}$, $\gamma_{231}$, $\gamma_{241}$ of the transitions T131, T141, T231, T241 from the states S11, S12 to the states S23, S24 for assuming that a phase slip has occurred. A determination of the values of these transition probabilities $\gamma_{131}$, $\gamma_{141}$, $\gamma_{231}$, $\gamma_{241}$ in dependence on a derived probability value Lsd'(t=2) and a predetermined phase slip probability P_slip has also been outlined.

It will now be outlined with regard to FIG. 6, how to stipulate states and transition probabilities for the time instances t=2 and t=3, in order to model potentially transmitted differentially encoded data symbols sd(t=3) together with differentially decoded data symbols s'(t=3) in case of no phase slip and in case of a phase slip.

FIG. 6 shows an extension EA2 of the algorithm EA already shown in FIG. 4.

FIG. 6 shows the states S21, S22, S23, S24 that were already shown in FIG. 4. Furthermore, states S31, S32, S33, S34 are shown, which represent corresponding respective assumed transmitted differentially encoded data symbols sd(t=3) and corresponding potentially affected differentially encoded data symbols sd'(t=3).

Assuming that no phase slip occurred from t=1 to t=2, the algorithm EA2 is either in the state S21 or the state S22. State transitions T112, T122, T122, T222 from these states S21, S22 to the states S31, S32 are shown. These state transitions T112, T121, T122, T222 represent corresponding differentially decoded data symbols s(t=3) assuming that no phase slip occurred from the time t=2 to the time t=3, as indicated in FIG. 6. Therefore, the transition probabilities $\gamma_{111}$, $\gamma_{121}$, $\gamma_{211}$, $\gamma_{221}$ are determined using a derived probability value Lsd' (t=3), as previously described in detail for the example of t=2, together with a weighting term of log(1−P_slip).

Assuming that a phase slip occurred from t=1 to t=2, the algorithm EA2 is either in the state S23 or the state S24. State transitions T332, T342, T432, T442 from these states S23, S24 to the states S33, S34 are shown. These state transitions T332, T341, T432, T442 represent corresponding differentially decoded data symbols s(t=3) assuming that no phase slip occurred from the time t=2 to the time t=3, as indicated in FIG. 6. Therefore, the transition probabilities $\gamma_{332}$, $\gamma_{342}$, $\gamma_{432}$, $\gamma_{442}$ are determined using a derived probability value Lsd' (t=3), as previously described in detail for the example of t=2, together with a weighting term of log(1−P_slip).

Assuming that a phase slip occurred from t=1 to t=2, such that the algorithm EA2 is on one of the states S23 or S24, and assuming also furthermore, that a phase slip occurs from t=2 to t=3, this causes a further rotation of the constellation diagram from t=2 to t=3. This is modelled by a transition from one of the states S23 or S24 to one of the other states S31 or S32. The state transitions modelling the phase slip from t=2 to t=3 are the state transitions T312, T322, T412, T422 from these states S23, S24 to the states S33, S34, as shown in FIG. 6. The corresponding transition probabilities $\gamma_{312}$, $\gamma_{322}$, $\gamma_{412}$, $\gamma_{422}$ are determined using a derived probability value Lsd'(t=3), as previously described in detail for the example of t=2, together with a weighting term of log(P_slip).

Assuming that no phase slip occurred from t=1 to t=2, the algorithm EA2 is either in the state S21 or the state S22. State transitions T132, T142, T232, T242 from these states S21, S22 to the states S33, S34 can be stipulated, to represent corresponding differentially decoded data symbols s(t=3) assuming that no phase slip occurred from the time t=2 to the time t=3. These state transitions T132, T142, T232, T242 are not indicated in FIG. 6 for the sake of presentability. Corresponding transition probabilities $\gamma_{111}$, $\gamma_{121}$, $\gamma_{211}$, $\gamma_{221}$ can be determined using a derived probability value Lsd'(t=3), as previously described in detail for the example of t=2, together with a weighting term of log(1−P_slip).

With regard to the FIG. 4, it has been described in detail, how to stipulate in the estimation algorithm EA states and transition probabilities for the time instances t=1 and t=2, in order to model potentially transmitted differentially encoded data symbols sd(t=2) together with differentially decoded data symbols s(t=2) in case of no phase slip as well as in case of a phase slip. Then, with regard to the FIG. 6, it has been described in detail, how to stipulate in an extension EA2 of the estimation algorithm states and transition probabilities for the time instances t=2 and t=3, in order to model potentially transmitted differentially encoded data symbols sd(t=3) together with differentially decoded data symbols s(t=3) in case of no phase slip as well as in case of a phase slip. A person skilled in the art may combine the algorithm EA shown in FIG. 4 with the algorithm extension EA2 shown in FIG. 6 and extend this combined algorithm by more states and transitions for further successive time instances t=1, ..., T, in order to model potentially transmitted differentially encoded data symbols sd(t) together with differentially decoded data symbols s(t) for these time instances t=1, ..., T in case of no phase slip as well as in case of a phase slip.

Figure 7:
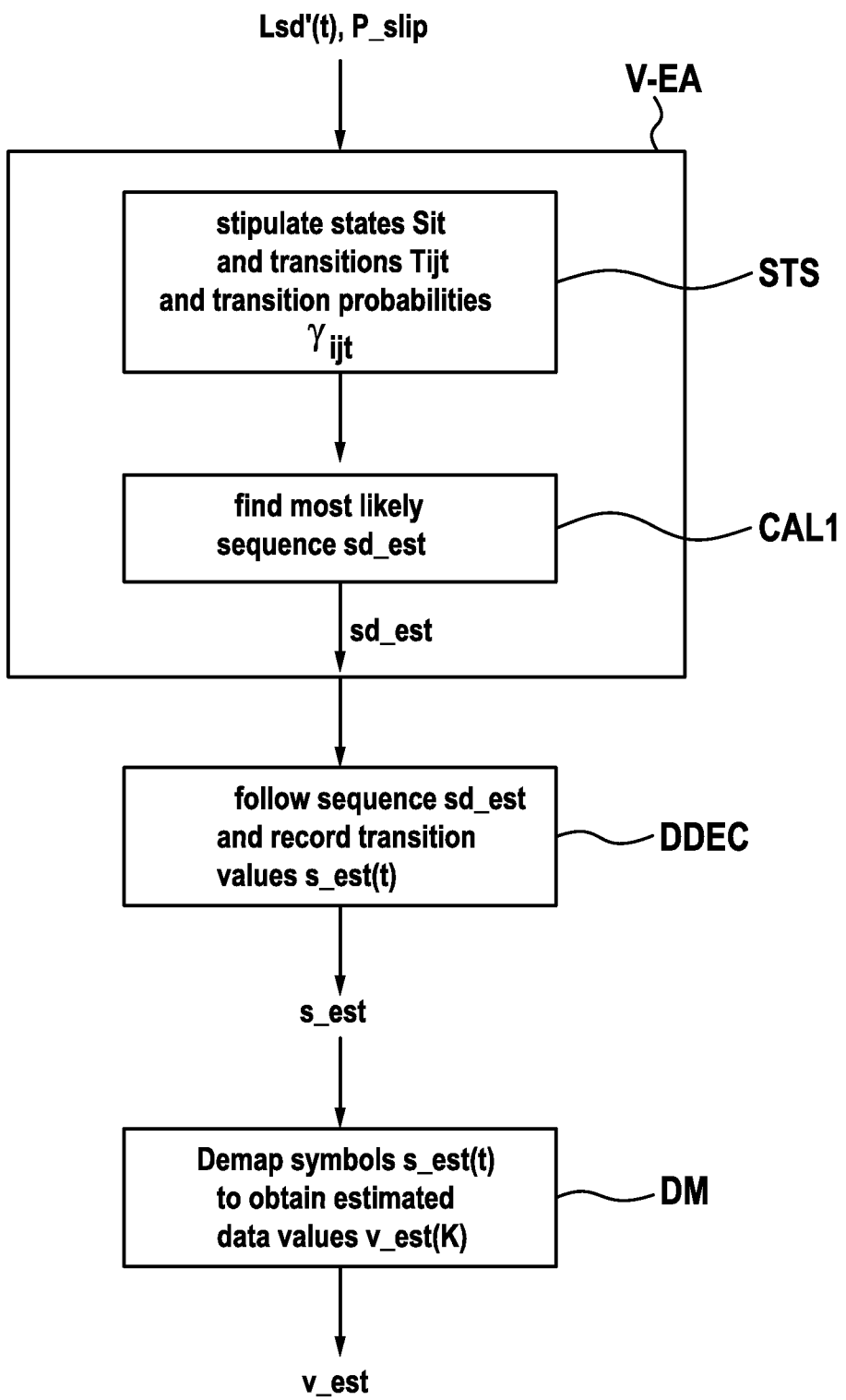
FIG. 7 show a method using an estimation algorithm for deriving differentially decoded data values according to an embodiment.

As it has been mentioned previously, there are at least two alternative estimation algorithms that may be used in order to derive a sequence of differentially decoded data values. FIG. 7 shows steps of using a first alternative estimation algorithm for deriving a sequence of differentially decoded data values.

FIG. 7 shows a Viterbi estimation algorithm V-EA. The algorithm is provided with the probability values Lsd'(t) for t=1, ..., T in the logarithmic domain, and the probability of a phase slip P_slip. The algorithm V-EA stipulates in a stipulation step STS states Sit and transitions Tijt together with the corresponding transition probabilities $\gamma_{ijt}$, as it has been described in detail previously with regard to the FIGS. 4 and 6. To recall details, Sit is the state with index i at the time t. To recall further details, Tijt is the transistion from the state with index i at the time t−1 to the state with the index j at the time t.

In a calculation step CAL1 the Viterbi estimation algorithm V-EA finds that sequence sd_est of states Sit, representing differentially encoded data symbols sd(t) from t=1 to t=T, for which the overall probability of this sequence sd_est is the highest. In other words, the Viterbi estimation algorithm V-EA maximises the probability, that the determined sequence sd_est is indeed the sequence of the actually transmitted differentially encoded data symbols.

For the step CAL1 of solving for the most likely states, a detailed description of the Viterbi algorithm can be found in "A. J Viterbi, '*Error bounds for convolutional codes and an asymptotically optimal decoding algorithm*', IEEE Transactions on Information Theory, Vol. IT-13, pp. 260-269, April 1967" or alternatively in "Lawrence R. Rabiner, '*A Tutorial on Hidden Markov Models and Selected Applications in Speech Recognition*', IEEE Proceedings, Vol. 77, No.2, February 1989". Care should be taken that notations of probabilities may be given in these references in the linear domain, while the transition probabilities $\gamma_{ijt}$ are provided in the logarithmic domain.

In a step of differential decoding DDEC, one may use the most likely state sequence sd_est=[sd_est(1), ..., sd_est(T)], provided by the Viterbi estimation algorithm V-EA, together with the previously stipulated states Sit and the state transitions Tijt, as illustrated in the FIGS. 4 and 6, for finding an estimated sequence of differentially decoded data symbols s_est=[s_est(1), ..., s_est(T)]. This can be performed, by following the estimated most likely state sequence sd_est=[sd_est(1), ..., sd_est(T)] through the stipulated states, and by recording the sequence s_est=[s(1), ..., s(T)] as those differentially decoded data values s(t), which are associated to the state transitions Tijt connecting the states Sit of the most likely state sequence sd_est.

In a demapping step DM, a sequence v_est=[v_est(1), ..., v_est(K)] of estimated differentially decoded data values v_est(K) can be derived, by demapping the data symbols of the sequence s_est=[s_est(1), ..., s_est(T)] according to the used PSD constellation diagram.

Figure 8:
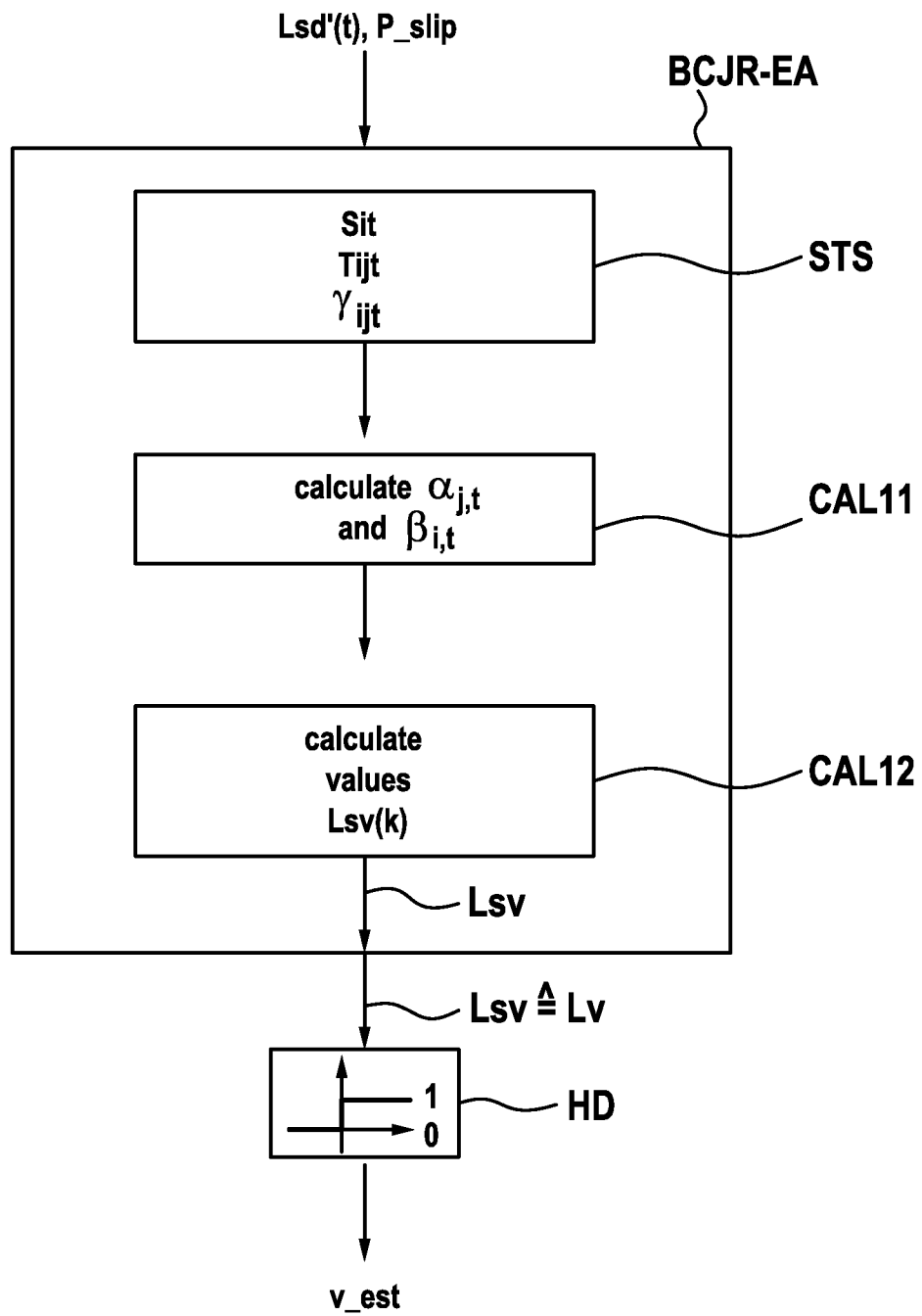
FIG. 8 shows the method using an estimation algorithm for deriving differentially decoded data values according to a further embodiment.

FIG. 8 shows steps of using a second alternative estimation algorithm for deriving a sequence of differentially decoded data values.

FIG. 8 shows a BCJR estimation algorithm BCJR-EA. The algorithm is provided with the probability values Lsd'(t) for t=1, ..., T in the logarithmic domain, and the probability of a phase slip P_slip. The algorithm V-EA stipulates in a stipulation step STS states Sit and transitions Tijt together with the corresponding transition probabilities $\gamma_{ijt}$, as it has been described in detail previously with regard to FIG. 7.

In a calculation step CAL11, the estimation algorithm BCJR-EA calculates for each stipulated state Sit a forward pass-message $\alpha_{j,t}$, wherein j is the state index and t is the time index. For the states Si1 at the time t=1, the forward pass-messages $\alpha_{j,1}$ are initialized to the values $$\alpha_{j,1} = \log\left(\frac{1}{I}\right), \text{ for } j = 1, \ldots, I,$$

wherein I is the number of different states at a time instance. For further time instances t=2, ..., T, the forward pass-messages $\alpha_{j,t}$ are calculated as $$\alpha_{j,t} = \Sigma_{i=1}^{I}[+](\alpha_{i,t-1} + \gamma_{i,j,t}),$$

for the states j=1, ..., I, wherein $\alpha_{i,t-1}$ is the forward pass-message of the i-th state at the previous time instance t−1 and $\gamma_{i,j,t}$ is the transition probability from the i-th state at time t−1 to the j-th state at time t.

The sum operator $\Sigma[+]$ indicates a summation of the summands according to the rule $$a[+]b = \log\frac{1 + e^a e^b}{e^a + e^b},$$

which is also known as the 'box-plus' operator [+]. Algebraic rules for this box-plus operator can be found in detail in "J. Hagenauer, E. Offer, L. Papke, *'Iterative Decoding of Binary Block and Convolutional Codes'*, IEEE Transactions on Information Theory, Vo. 42, No.2, March 1996".

Furthermore, in the calculation step CAL11, the estimation algorithm BCJR-EA calculates for each stipulated state Sit a backward pass message $\beta_{i,t}$, wherein i is the state index and t is the time index. For the states SiT at the time t=T, the backward pass-messages $\beta_{i,T}$ are initialized to the values $$\beta_{i,T} = \log\left(\frac{1}{I}\right), \text{ for } i = 1, \ldots, I,$$

wherein I is the number of different states at a time instance.

For further time instances t=T−1, T−2, . . . , 2, 1, the backward pass-messages $\beta_{i,t}$ are calculated as $$\beta_{i,t} = \Sigma_{j=1}^{I}[+](\beta_{j,t+1} + \gamma_{i,j,t}),$$

for the states i=1, . . . , I, wherein $\beta_{j,t+1}$ is the backward pass-message of the j-th state at the previous time instance t+1 and $\gamma_{i,j,t}$ is the transition probability from the i-th state at time t to the j-th state at time t+1. Also here, the sum operator $\Sigma[+]$ indicates a box-plus summation as previously mentioned.

As previously outlined in detail, each of the stipulated states Sit represents a potentially transmitted differentially encoded data symbol sd(t), while to each of the stipulated transitions Tijt a corresponding differentially decoded data symbol s(t) is associated. Each differentially decoded data symbol s(t) consists of a set of L differentially decoded data symbol values sv(l,t)

$$s(t)=[sv((t-1)L+1), \ldots, sv((t-1)L+1), \ldots, sv((t-1)L+L)]$$

with index l=1, . . . , L.

These L differentially decoded data symbol values sv(l,t) are equal to the set of L differentially decoded data values v(l,t) represented by the differentially decoded data symbol s(t) as $$s(t)=[v((t-1)L+1), \ldots, v((t-1)L+1), \ldots, v((t-1)L+L)].$$

Therefore, a sequence of differentially decoded data symbols $$s=[s(1), \ldots, s(T)]$$

represents for T=M and with L=K/M—as previously introduced at the beginning—a sequence sv of K differentially decoded data symbol values as $$sv=[sv(1), \ldots, sv(k), \ldots, sv(K)], \text{ with index } k=1, \ldots K,$$

which is equal to a sequence v of K differentially decoded data values as $$v=[v(1), \ldots, v(k), \ldots, v(K)], \text{ with index } k=1, \ldots K.$$

In a next calculation step CAL12, the estimation algorithm BCJR-EA determines for a sequence sv of K differentially decoded data symbol values a sequence $$Lsv=[Lsv(1), \ldots, Lsv(K)], \text{ with index } k=1, \ldots K,$$

of probability values Lsv(k). These probability values Lsv(k) are log-likelihood values in the logarithmic domain, wherein a probability value Lsv(k) indicates the probability whether a corresponding differentially decoded data symbol value sv(k) is equal a '1' or equal a '0'. To recall details, for a high probability of P(sv(k)=1), the probability value Lsv(k) takes on large positive values, while for a high probability of P(sv(k)=0), the probability value Lsv(k) takes on large negative values.

Since the sequence sv of the K differentially decoded data symbol values sv(k) is equal to a sequence v of K differentially decoded data values, the sequence Lsv of the probability values Lsv(k) can be considered as a sequence $$Lv=[Lv(1), \ldots, Lv(K)], \text{ with index } k=1, \ldots K,$$

with probability values Lv(k), which indicate the probability whether a corresponding differentially decoded data value v(k) is equal a '1' or equal a '0'.

For the determination of the sequence Lsv in the step CAL12, the estimation algorithm BCJR-EA uses the calculated forward pass-messages $\alpha_{j,t}$ and the calculated backward pass-messages $\beta_{i,t}$.

For the step CAL21 of determining the sequence of probability value Lsv=[Lsv(1), . . . , Lsv(K)], a detailed description of the BCJR algorithm can be found in "L. Bahl, J. Cocke, F. Jelinek, and J. Raviv, *'Optimal Decoding of Linear Codes for minimizing symbol error rate'*, IEEE Transactions on Information Theory, vol. IT-20(2), pp.284-287, March 1974", as well as in "David J. C. MacKay, *'Information Theory, Inference, and Learning Algorithms'*, Cambridge University Press, Version 72, March 28, 20052003, Chapter 25, pp. 324 to 333". Care should be taken that notations of probabilities may be given in these references in the linear domain, while the transition probabilities $\gamma_{ijt}$ are provided in the logarithmic domain.

The sequence Lsv of probability values determined by the BCJR estimation algorithm BCJR-EA is then provided to a step HD of hard decision as a sequence Lv. In the case, that a probability value Lv(k) is positive, it is decided that the corresponding differentially decoded data value v(k) is equal to '1'. In the case, that a probability value Lv(k) is negative, it is decided that the corresponding differentially decoded data value v(k) is equal to '0'. By this, the step HD of hard decision derives an estimated sequence v_est=[v_est (1), . . . , v_est (K)] of estimated differentially decoded data values v_est(k). The final step HD of hard decision acting on the a posteriori probability values Lv(k) for deriving the estimated sequence v_est=[v_est (1), . . . , v_est (K)] maximises the individual probabilities of the sequence elements v_est(k).

Figure 9:
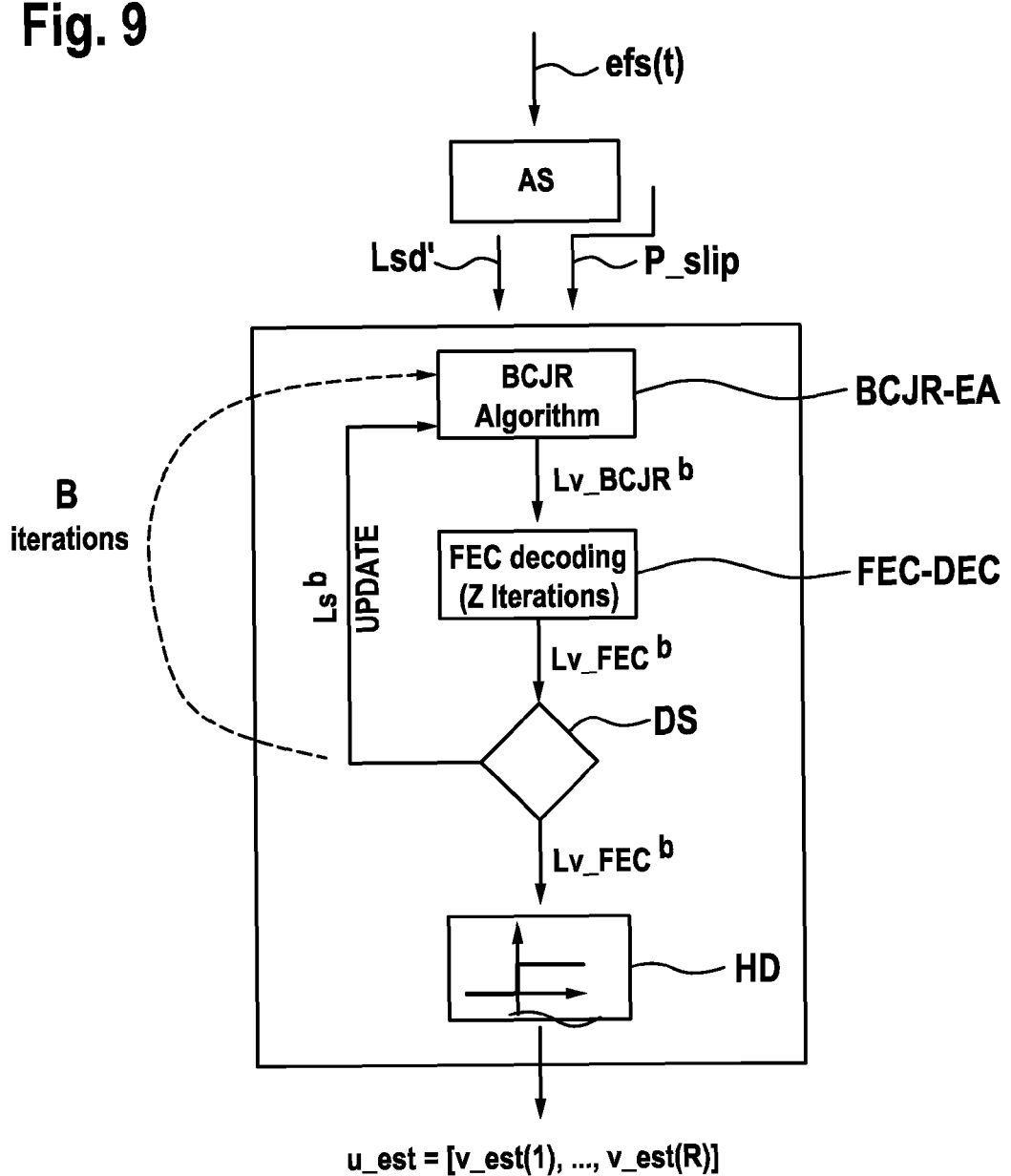
FIG. 9 shows further steps of an alternative solution of the method according to the further embodiment.

FIG. 9 shows further steps of the method shown in FIG. 8 according to an alternative solution. According to this solution, the sequence of data values v, shown in FIG. 1, which is used to generate the optical transmission signal ots(t) at the transmission device TD, is assumed to be a sequence of forward error correction (FEC) data values. It is assumed, that the FEC sequence of data values v was generated, by encoding a sequence u of information data values $$u=[u(1), \ldots, u(R)], \text{ with index } r=1, \ldots, R,$$

wherein R is a number smaller than K, using a systematic FEC code. The FEC code does not necessarily have to be a systematic code, but for reasons of presentability the example described in detail us based on a systematic code.

A first example of an FEC code that may be used is a Turbo Code. A second example of an FEC code that may be used is a Low-Density-Parity-Check (LDPC) Code. A third example of an FEC code that may be used is a Convolutional Code.

Since, in this example, the FEC code is a systematic code, the resulting FEC sequence of data values $$v=[v(1), \ldots, v(R), \ldots, v(K)], \text{ with index } k=1, \ldots, K,$$

consists at its R first data values v(k) of the information data values u(R) as $$v=[u(1), \ldots, u(R), v(R+1) \ldots, v(K)].$$

According to FIG. 9, the electrical filtered signal efs(t) is used to derive in the analysis step AS a sequence of probability values Lsd', as already explained in detail with regard to the FIGS. 5a and 5b.

The probability values Lsd'(t) and the phase slip probability P_slip are provided to an estimation step ES'. In a substep BCJR-EA of the estimation step ES', the BCJR Algorithm is used, to determine a sequence of probability values Lv, as previously described in detail with regard to FIG. 8, which is depicted in FIG. 9 as the sequence $Lv\_BCJR^b$ with an iteration step b=1, ..., B.

The sequence of log-likelihood probability values $Lv\_BCJR^b$ is provided to a FEC decoding algorithm FEC-DEC, which is suitable to derive from the provided sequence of log-likelihood probability values $Lv\_BCJR^b$ an updated sequence of log-likelihood probability values $Lv\_FEC^b$.

Figure 10:
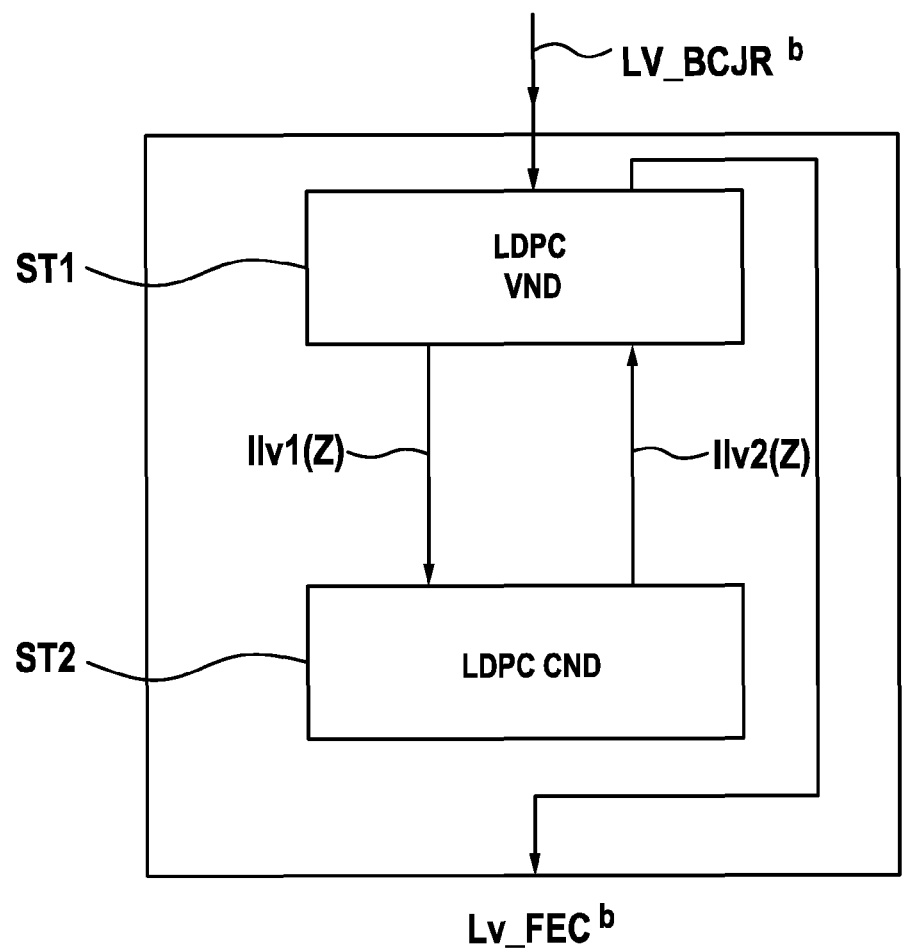
FIG. 10 shows sub-steps of updating a sequence of probability values.

Sub-steps ST1, ST2 for the step FEC-DEC of the FEC decoding algorithm are shown in FIG. 10 for the example of the FEC encoding algorithm being a LDPC code. In the step FEC-DEC, the sequence of log-likelihood probability values $Lv\_BCJR^b$ is received.

A LDPC variable node decoder (VND) receives the sequence $Lv\_BCJR^b$ in the sub-step ST1. In dependence on a predefined parity check matrix of the LDPC code, not shown in FIG. 10, the LDPC-VND passes on log-likelihood values IIv1(z=1) in a sub-iteration step z=1 to a LDPC check node decoder (CND) of a substep ST2. Furthermore, in this sub-iteration step z=1, the LDPC-CND passes back log-likelihood values IIv2(z=1) to the LDPC-VND in dependence on the specific predefined check matrix of the LDPC code. More than one sub-iteration with index z may be carried out between the sub-step ST1 and the sub-step ST2. After a number of Z fourth-and-back sub-iterations between the sub-steps ST1 and ST2, the LDPC-VND passes the resulting sequence of log-likelihood probability values $Lv\_FEC^b$ on to the output of the FEC decoding algorithm step FEC-DEC. A detailed description of deriving the resulting sequence of log-likelihood probability values $Lv\_FEC^b$ from an input sequence of log-likelihood probability values $Lv\_BCJR^b$ using a LDPC-VND and a LDPC-CND can be found in "Frank R. Kschischang, Brendan J. Frey, Hans-Andrea Loeliger/Factor graphs and the sum-product algorithm, IEEE TRANSACTIONS ON INFORMATION THEORY, VOL. 47, NO. 2, FEBRUARY 2001".

Coming back to FIG. 10, for the case that the FEC encoding algorithm is a Turbo Code or a Convolutional Code, then a derivation of the sequence of log-likelihood probability values $Lv\_FEC^b$ from the sequence of log-likelihood probability values $Lv\_BCJR^b$ can be performed in the step FEC-DEC as outlined in "J. Hagenauer, E. Offer, L. Papke, '*Iterative Decoding of Binary Block and Convolutional Codes*', IEEE TRANSACTIONS ON INFORMATION THEORY, Vol.42, No.2, March1996 ".

In a next decision step DS, it is decided whether the derived sequence of log-likelihood probability values $Lv\_FEC^b$ is used to determine an estimated differentially decoded sequence u_est of information data values, or whether the derived sequence of log-likelihood probability values $Lv\_FEC^b$ is used in a further iteration step with index b=1, 2, ..., B.

In a next iteration step b=2, the derived sequence of log-likelihood probability values $Lv\_FEC^b$ is used to update transition probabilities of the estimation algorithm BCJR-EA. The elements $Lv\_FEC^b(k)$ of the derived log-likelihood probability value sequence $$Lv\_FEC^b=[Lv\_FEC^b(1), \ldots, Lv\_FEC^b(K)]$$

indicate probabilities of differentially decoded data values v(k) of a corresponding sequence $$v=[v(1), \ldots, v(K)]$$

Since a differentially decoded data symbol s(t) is represented by a set of L differentially decoded data values v(k), a log-likelihood probability value sequence $$Ls\_FEC^b=[Ls\_FEC^b(1), \ldots, Ls\_FEC^b(T)]$$

of the length T=M with K/L=M can be derived from the log-likelihood probability value sequence $Lv\_FEC^b$. This is achieved, by determining the t-th log-likelihood probability value $Ls\_FEC^b$ (t) as $$Ls\_FEC^b(t) = \sum_{k=(t-1)L+1}^{(t-1)L+L} Lv\_FEC^b(k)$$

For the example of BPSK, L is equal to 1 and K=T, such that a value of $Ls\_FEC^b$ (t) is equal to the corresponding value $Lv\_FEC^b$ (t).

The derived log-likelihood probability values $Ls\_FEC^b$ (t) indicate probablities of the corresponding differentially decoded data symbols s(t).

Figure 11:
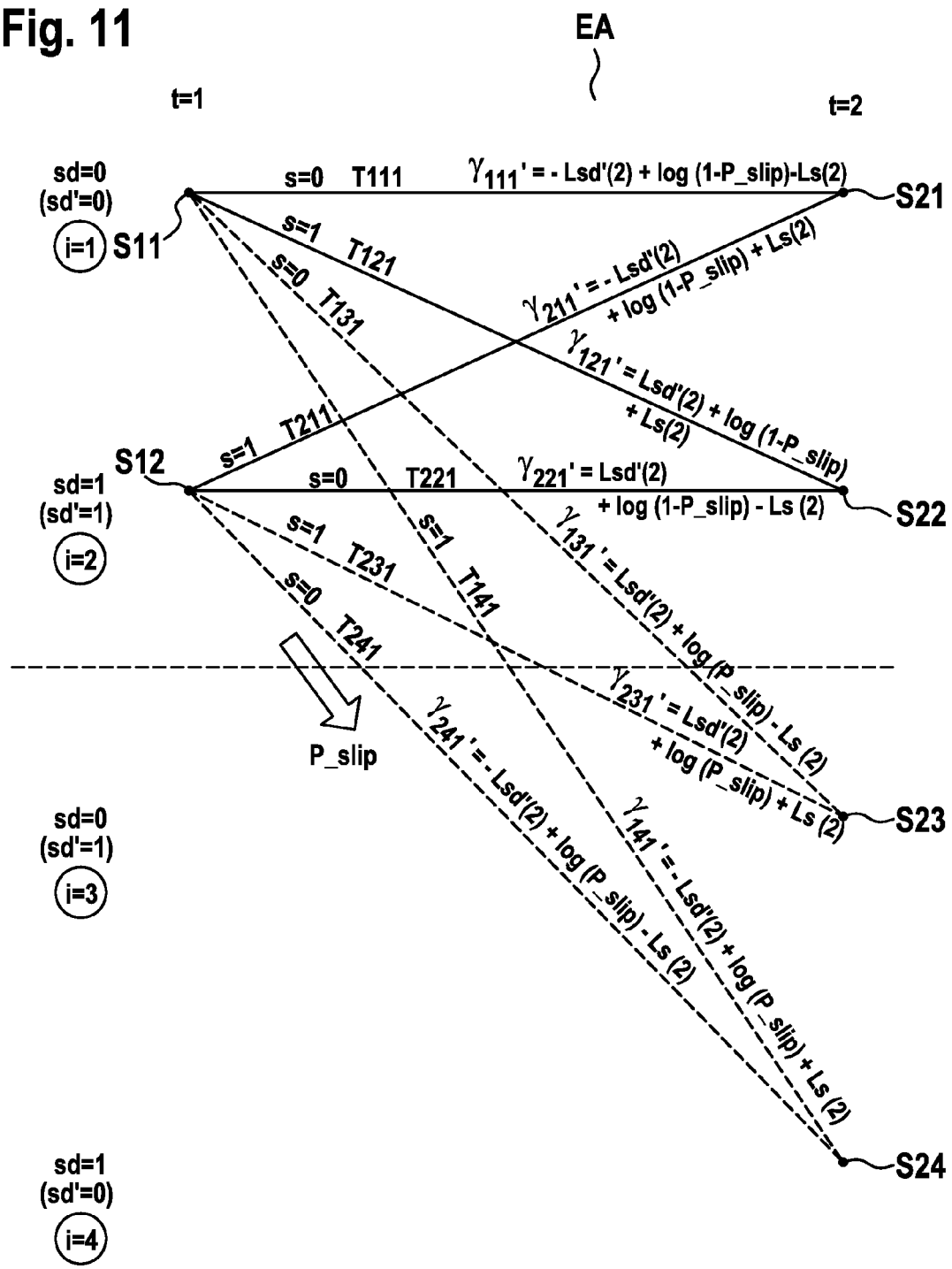
FIG. 11 shows the states and the state transitions of the estimation algorithm together with updated transition probabilities.

FIG. 11 shows updated transition probabilities $\gamma_{111}'$, ... $\gamma_{241}'$ of an updated estimation algorithm EA_UD, which is apart from the updated transition probabilities $\gamma_{111}', \ldots \gamma_{241}'$ equal to the estimation algorithm EA previously shown in FIG. 4.

The transition probabilities $\gamma_{111}', \ldots \gamma_{241}'$ are updated by the derived log-likelihood probability values $Ls\_FEC^b$ (t). In detail, the transition probabilities $\gamma_{111}', \ldots \gamma_{241}'$ from the time t=1 to the time t=2 are updated, by weighting them based on the derived log-likelihood probability value $Ls\_FEC^b$ (t=2).

For transition probabilities, which assume a differentially decoded data symbol of s(2)=1, an update is performed, by adding to them the value of $$+Ls\_FEC^b(t=2).$$

For transition probabilities, which assume a differentially decoded data symbol of s(2)=0, an update is performed, by adding to them the value of $$-Ls\_FEC^b(t=2).$$

This is illustrated in detail in FIG. 10.

Figure 12:
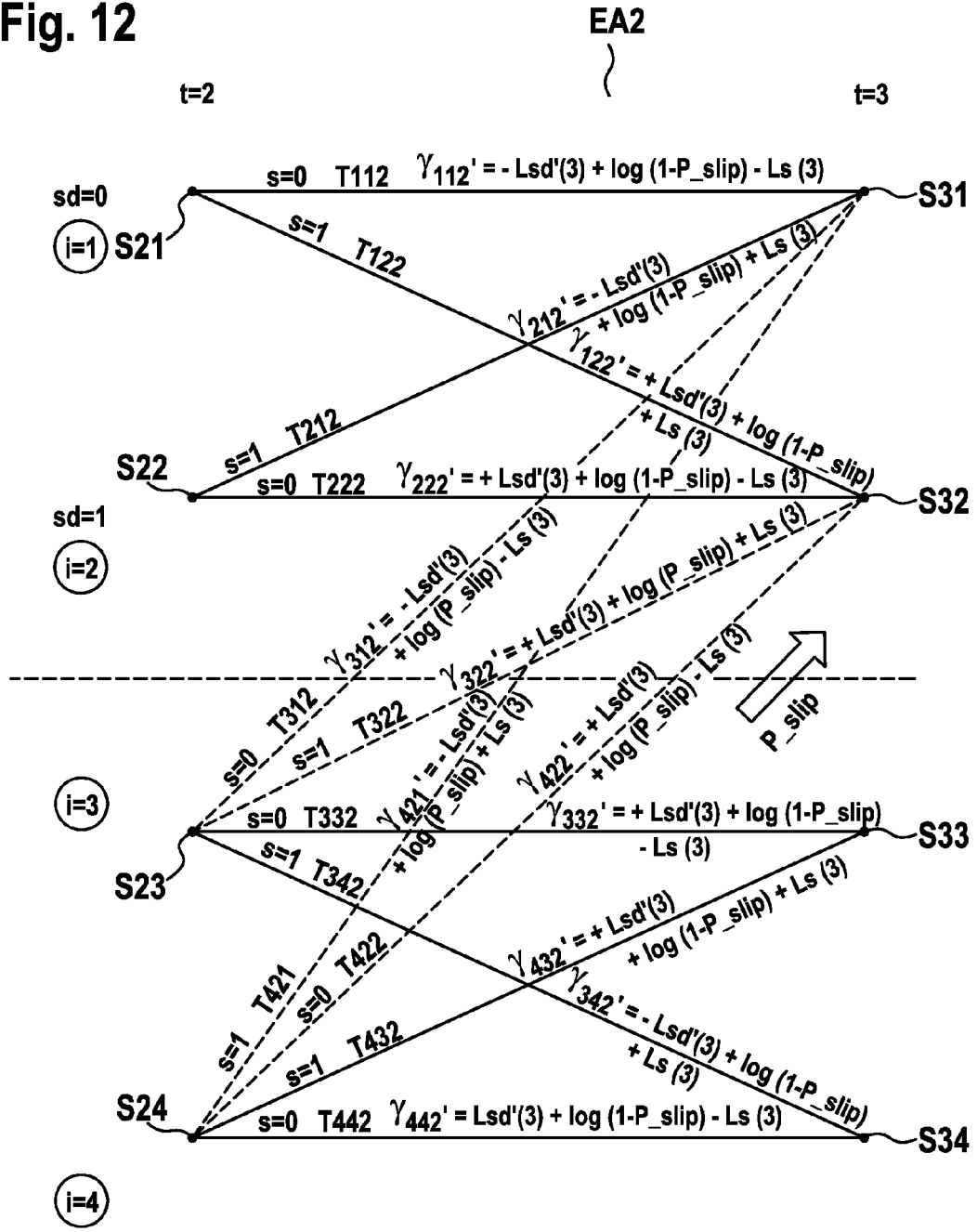
FIG. 12 shows the further states and the further state transitions of the estimation algorithm together with updated transition probabilities.

Updated transition probabilites for the estimation algorithm extension EA2, previously shown in FIG. 6, are shown in detail in FIG. 12 for an updated estimation algorithm extension EA2_UP. In this updated estimation algorithm extension EA2_UP, the transition probabilities for transitions from t=2 to t=3 are updated, using the derived log-likelihood probability value $Ls\_FEC^b$ (t=3).

For transition probabilities, which assume a differentially decoded data symbol of s(3)=1, an update is performed, by adding to them the value of $$+Ls\_FEC^b(t=3).$$

For transition probabilities, which assume a differentially decoded data symbol of s(3)=0, an update is performed, by adding to them the value of $-Ls\_FEC^b(t=3)$.

This is illustrated in detail in FIG. 11.

Coming back to FIG. 10, a new sequence of log-likelihood probability values $Lv\_BCJR^b$ are determined in an iteration step b=2, using the updated BCJR algorithm BCJR-EA and the initially derived sequence of log-likelihood probability values Lsd'.

Further iterations with index b may be carried out in the estimation step ES', including in each iteration one or more sub-iterations of the forward error decoding step FEC-DEC with sub-index z.

After a number of B iterations, the resulting sequence of log-likelihood probability values $Lv\_FEC^B$ is provided to a hard decision step HD. Since the used FEC code is a systematic FEC code, the hard decision step HD uses a sequence Lv_cut of the first R log-likelihood probability values of the sequence $Lv\_FEC^B$ as $Lv\_cut=[Lv\_FEC^B(1), \ldots, Lv\_FEC^B(R)]$, for deriving an estimated sequence u_est of R differentially decoded information data values as $u\_est=[v\_est(1), \ldots, v\_est(R)]$.

The step HD of hard decision detection has been described previously in detail with regard to FIG. 8.

The advantage of updating the transition probabilities of the estimation algorithm BCJR-EA, using the derived log-likelihood values $Ls\_FEC^b(t)$ of the differentially decoded data symbols s(t), in combination with stipulated states and transition probabilities for the case of no phase slip and for the case of a phase slip, is illustrated by the simulation results shown in the FIGS. 18, 19 and 20, which will be discussed in detail later on.

To summarize the explanations given with regard to the FIGS. 9, 10 and 11: The received optical data signal is a signal that is also encoded by a FEC encoding algorithm, The estimation algorithm BCJR-EA is suitable to maximise one or more probabilities with respect to the differentially decoded data values. From the received optical signal probability values indicating a probability of respective received differentially encoded data symbols are derived. The estimation algorithm determines from the derived probability values of the respective received data symbols probability values indicating a probability of respective differentially decoded data values. The determined probability values indicating a probability of respective differentially decoded data values are modified and updated, using a suitable algorithm that accounts for the FEC encoding algorithm.

In an iteration set, an update of the stipulated transition probabilities may be carried out, by weighting the stipulated transition probabilities using the modified probability values indicating a probability of respective differentially decoded data values.

Preferably, the FEC encoding algorithm is a LDPC algorithm. The advantage of this is, that the LDPC algorithm may easily be adapted to the transmission properties of optical transmission channel. Each optical network link between two optical network nodes may have individual transmission properties and thus an individual phase slip probability. The combined coding system consisting of outer LDPC coding and inner differential coding may be adapted between these two optical network nodes to the individual phase slip probability of the individual optical network link. This adaptation may be carried out, by a modification of the LDPC code in dependence of a provided phase slip probability. For a set of given phase slip probabilities a set of respective LDPC code generator matrices and a set of respective LDPC code parity check matrices may be provided. If the phase slip probability of the individual optical network link is known, then the LDPC code can be modified quite flexible, by changing the bit entries of the LDPC parity check matrix and also changing the bit entries of the LDPC generator matrix in correspondence to the provided LDPC matrices.

It has been explained in detail with regard to the example of BPSK, in which way a stipulation of states and transitions probabilities, for the case of no phase slip and for the case of no phase slip, can be carried out. For BPSK, only two designated phase values representing two possible data symbols are used. It will now be explained, in which way the proposed principle of stipulating of states and transitions probabilities, for the case of no phase slip and for the case of no phase slip, can be adapted for a solution of PSK using more than two designated two phase values. This is now described for the example of QPSK with four designated phase values and four possible data symbols.

Figure 13:
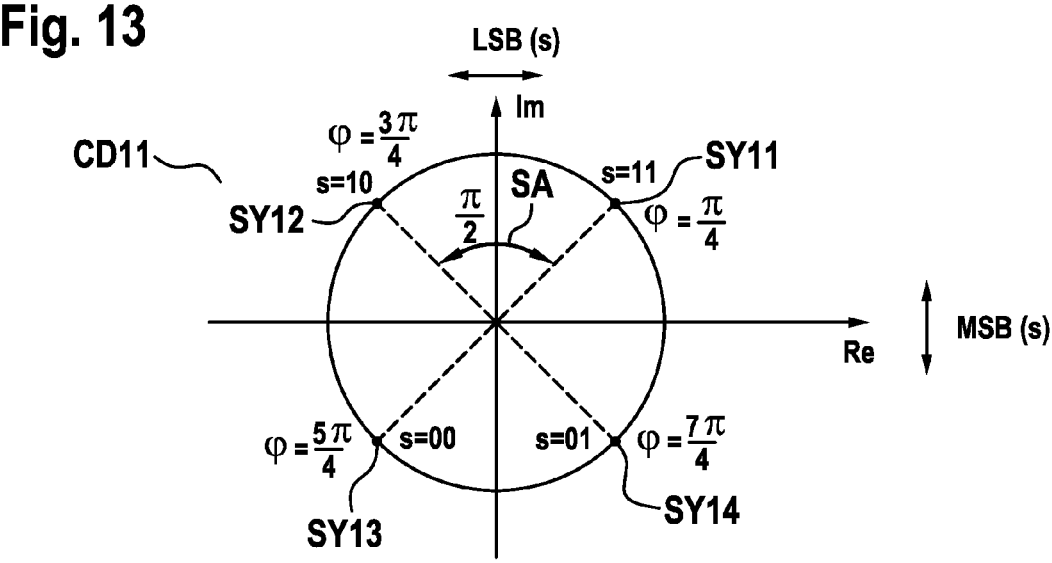
FIG. 13 shows a QPSK constellation diagram.

FIG. 13 shows a QPSK constellation diagram CD11 together with designated constellation points SY11, SY12, SY13, SY14 of corresponding data symbols s. Each data symbol s represents a set of L=2 data values, which are in this example bits. The first bit may be called the most significant bit (MSB), while the second bit may be called the least significant bit (LSB). Preferably, the principle of gray labelling is applied, in which adjacent constellation points SY11, S12 differ by only one bit. As an alternative, as so called anti-gray labelling may be applied. The constellation points SY11, SY12 of data symbols with a positive value on the imaginary axis Im differ from the constellation points SY13, SY14 of data symbols with a negative value on the imaginary axis Im by the MSB. The constellation points SY11, SY14 of data symbols with a positive value on the real axis Re differ from the constellation points SY12, SY13 of data symbols with a negative value on the real axis Re by the LSB. Adjacent constellation points are separated by a separation angle SA of $\pi/2$.

Figure 14:
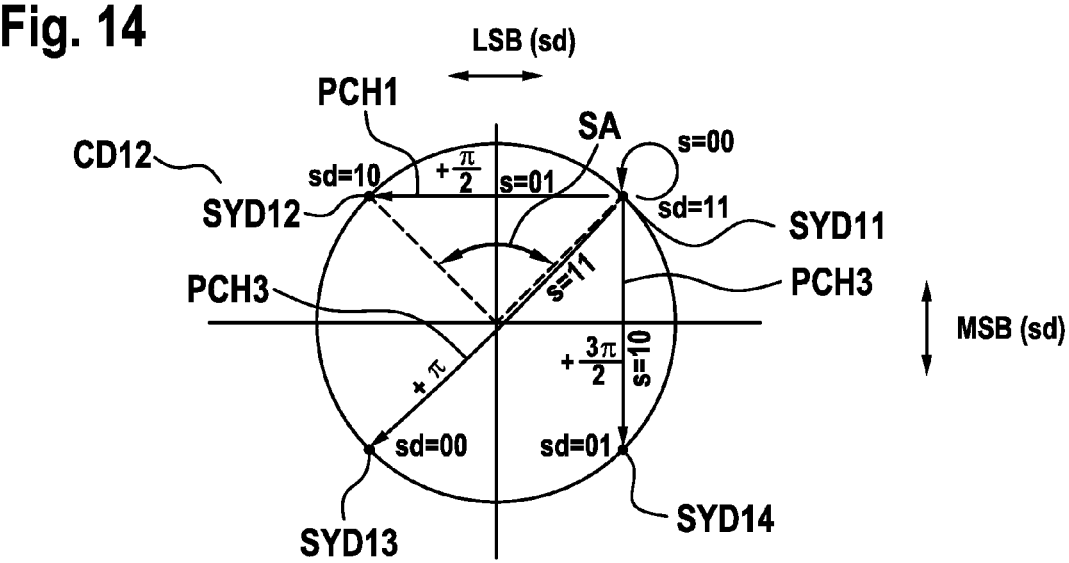
FIG. 14 shows a QPSK constellation diagram in case of differential encoding

Differential encoding of the data symbols shown in FIG. 13 is carried out, by generating differentially encoded data symbols sd according to the constellation diagram shown in FIG. 14.

Differentially encoded data symbols sd are arranged at constellation points SYD11, SYD12, SYD13, SYD14, which are equivalent to the constellation points SY11, SY12, SY13, SY14 of FIG. 13. A change from a differentially encoded data symbol sd(t) from one time instance t to a differentially encoded data symbol sd(t+1) of a next time instance t+1 is carried out in dependence on the differentially encoded data symbol sd(t) of the time instance t and the data symbol s(st+1) of the next time instance t+1.

For example, if at the time instance t, the differentially encoded data symbol sd(t) is equal to sd=11, this represented by the constellation point SYD11.

If a data symbol s(st+1) of the next time instance t+1 is s(t+1)='00', then a change of the phase by 0 is carried out, which means that the differentially encoded data symbol sd(t+1) of the next time instance t+1 is sd(t+1)='11'.

If a data symbol s(st+1) of the next time instance t+1 is s(t+1)='01', then a change of the phase by $$+\frac{\pi}{2}$$

is carried out, which means that the differentially encoded data symbol sd(t+1) of the next time instance t+1 is sd(t+1)='10'.

If a data symbol s(st+1) of the next time instance t+1 is s(t+1)='11', then a change of the phase by+π is carried out, which means that the differentially encoded data symbol sd(t+1) of the next time instance t+1 is sd(t+1)='00'.

If a data symbol s(st+1) of the next time instance t+1 is s(t+1)='10', then a change of the phase by $$+\frac{3\pi}{2}$$

is carried out, which means that the differentially encoded data symbol sd(t+1) of the next time instance t+1 is sd(t+1)='01'. In other words, a phase change Δφ between differentially encoded data symbols sd of consecutive time instances is carried out in dependence on the symbol s(st+1) of the next time instance t+1. Therefore, the differentially encoded data symbol sd(t+1) of the next time instance t+1 depends on the differentially encoded data symbol sd(t) of the time instance t and the data symbol s(t) of the next time instance.

Corresponding transitions between differentially encoded data symbols sd of consecutive time instances for the case that the differentially encoded data symbol sd(t) of the time instance t is equal to '10, '00', or '01' may be derived in a manner that is analogue to the principle shown in FIG. 14.

It shall be assumed, that different phase slips may occur. Phase slips may occur, such that the constellation diagram may rotate by whole numbered multiples of the separation angle $$+\frac{\pi}{2}.$$

One phase slip may be a rotation of the constellation diagram CD12 by a phase of $$+\frac{\pi}{2}.$$

$$\varphi_{ROT} = +\frac{\pi}{2} \quad \rightarrow \quad \text{P\_slip}_{+\frac{\pi}{2}},$$

$$\varphi_{ROT} = \pi \quad \rightarrow \quad \text{P\_slip}_{\pi},$$

$$\varphi_{ROT} = +\frac{3\pi}{2} \quad \rightarrow \quad \text{P\_slip}_{+\frac{3\pi}{2}},$$

$$\varphi_{ROT} = 0 \quad \rightarrow \quad \text{P\_norm} = \left(1 - \text{P\_slip}_{+\frac{\pi}{2}} - \text{P\_slip}_{\pi} - \text{P\_slip}_{+\frac{3\pi}{2}}\right).$$

Another phase slip may be a rotation of the constellation diagram CD12 by a phase of π. Another phase slip may be a rotation of the constellation diagram CD12 by a phase of $$+\frac{3\pi}{2}.$$

These different possible phase slips will be considered later on in detail with regard to the FIG. 16 an 17.

Figure 15:
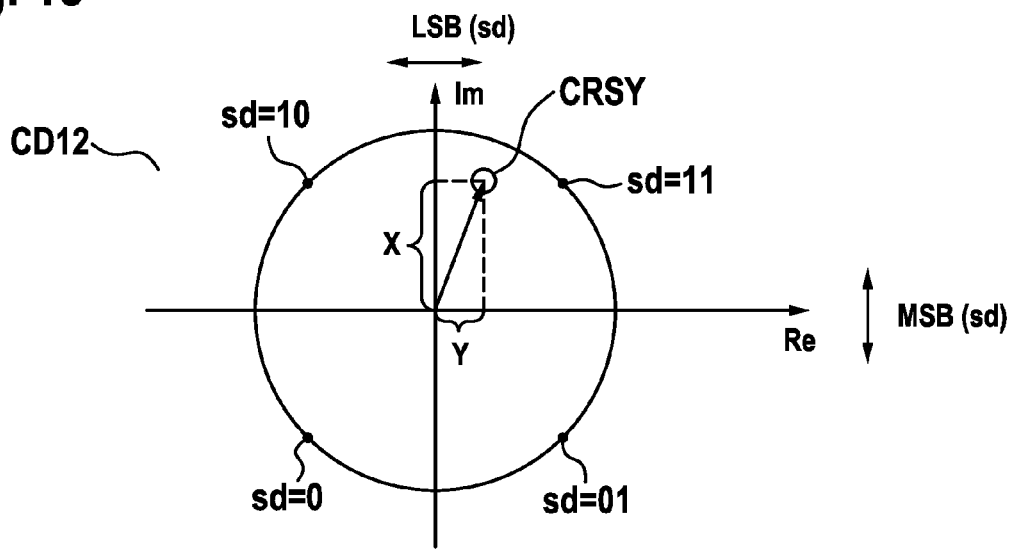
FIG. 15 shows a QPSK constellation diagram together with a received data symbol.

FIG. 15 shows the constellation diagram CD12 with constellation points of differentially encoded data symbols sd together with a corrected received differentially encoded data symbol CRSY. For each of the bits MSB and LSB, a separate log-likelihood value L_sd'_MSB, L_sd'_LSB is derived as a value indicating the probability whether the MSB or the LSB of the corrected received differentially encoded data symbol is a '1' or a '0'.

The log-likelihood value L_sd'_MSB of the MSB is derived, by taking the amplitude x of the corrected received differentially encoded data symbol CRSY on the imaginary axis Im, and setting the log-likelihood value L_sd'_MSB to $$Lsd'_{MSB} = \frac{2}{\sigma_N^2} x.$$

The log-likelihood value L_sd'_LSB of the LSB is derived, by taking the amplitude y of the corrected received differentially encoded data symbol CRSY on the real axis Re, and setting the log-likelihood value L_sd'_LSB to $$Lsd'_{LSB} = \frac{2}{\sigma_N^2} y.$$

Figure 16:
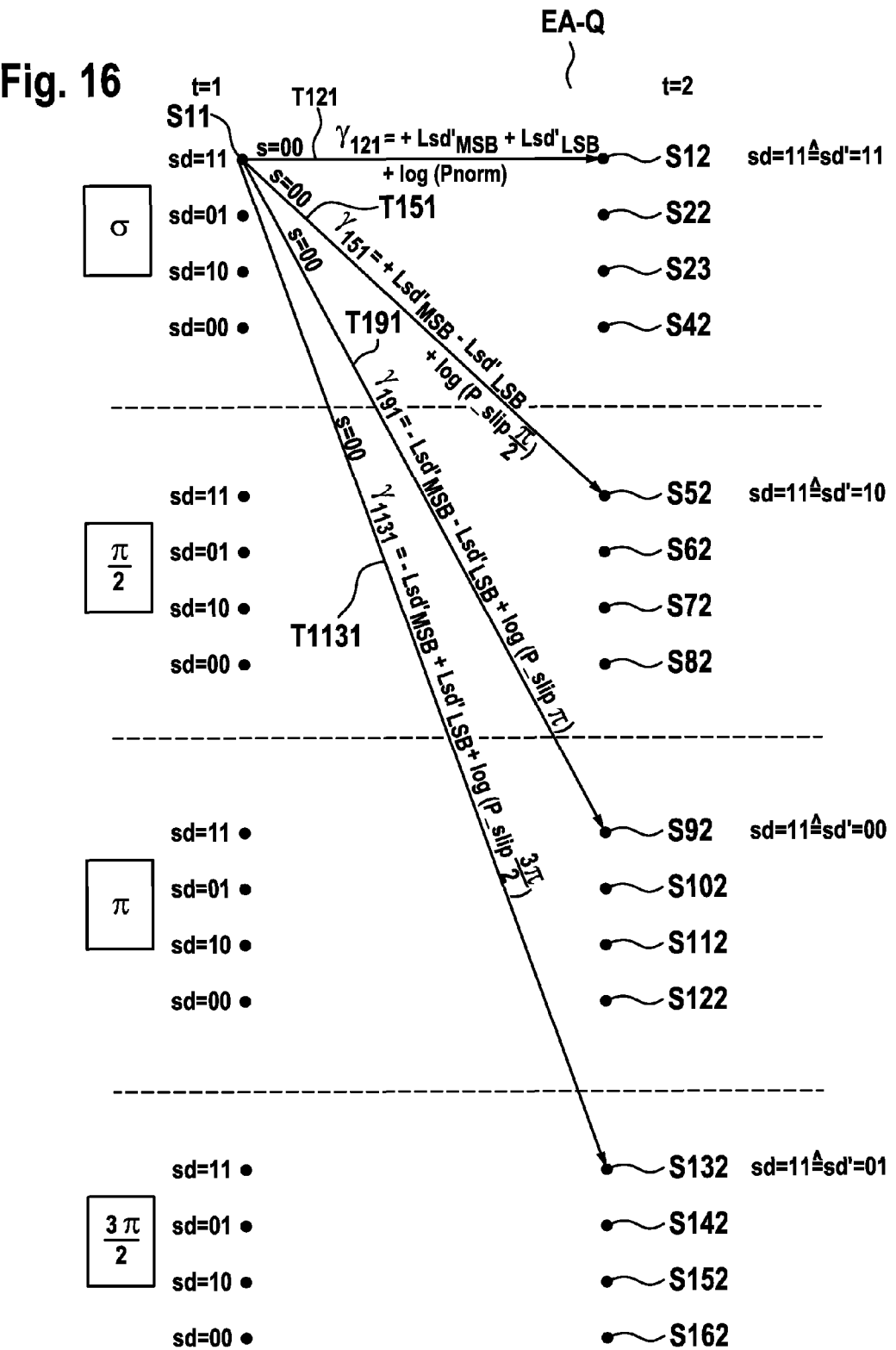
FIG. 16 shows states and transition probabilities of an estimation algorithm when using a QPSK constellation diagram.

FIG. 16 shows for an estimation algorithm EA-Q states and transitions for possible rotations of a QPSK constellation diagram by possible rotation angles φ$_{ROT}$ of $$0, \quad +\frac{\pi}{2}, \quad \pi, \quad +\frac{3\pi}{2}$$

between consecutive data symbols caused by corresponding phase slips. For a time instance with index t, the i-th state has an index of Sit in FIG. 16. For each possible rotation angle a corresponding predetermined phase slip probability P_slip is assumed as For each possible rotation angle $\phi_{ROT}$, a set of four states representing potentially transmitted differentially encoded data symbols sd is stipulated.

It shall be assumed, that at the time instance t=1 the differentially encoded data symbol shall be sd=11, which is represented by the state Sit=S11, with state index i=1 and time index t=1.

If the next differentially decoded data symbol s(t=2) is s(t=2)='00', and if no phase slip occurs, then a transition T121 to the state S12, representing sd(t=2)='11', occurs. The transition probability $\gamma_{121}$ is initialized to $\phi_{121}$=+L_sd'_MSB+L_sd'_LSB. Since the received corrected differentially encoded data symbol sd'(t=2) underlying the state S12 is equal to sd'(t=2)='11', both log-likelihood values L_sd'_LSB, L_sd'_MSB are considered with a multiplication by +1. The transition probability $\gamma_{121}$ is furthermore weighted by the log-value of the phase slip probability P_slip_norm for a rotation of $\phi_{ROT}$=0.

If the next differentially decoded data symbol s(t=2) is s(t=2)='00', and if a phase slip with $$\varphi_{ROT} = +\frac{\pi}{2}$$

occurs, then a transition T151 to the state S52, representing sd(t=2)='11' and also sd'(t=2)='10', occurs. The transition probability $\gamma_{151}$ is initialized to $\phi_{151}$=+L_sd'_MSB−L_sd'_LSB. Since the received corrected differentially encoded data symbol sd'(t=2) underlying the state S52 is equal to sd'(t=2)='10', the log-likelihood value L_sd'_MSB is considered with a multiplication by +1, while the log-likelihood value L_sd'_LSB is considered with a multiplication by −1. The transition probability $\gamma_{151}$ is furthermore weighted by the log-value of the phase slip probability $$P\_slip_{+\frac{\pi}{2}}$$

for a rotation of $$\varphi_{ROT} = +\frac{\pi}{2}.$$

If the next differentially decoded data symbol s(t=2) is s(t=2)='00', and if a phase slip with $\phi_{ROT}$=π occurs, then a transition T191 to the state S92, representing sd(t=2)='11' and also sd'(t=2)='00', occurs. The transition probability $\gamma_{191}$ is initialized to $\gamma_{191}$=−L_sd'_MSB−L_sd'_LSB. Since the received corrected differentially encoded data symbol sd' (t=2) underlying the state S92 is equal to sd'(t=2)='00', the log-likelihood value L_sd'_MSB is considered with a multiplication by −1, and also the log-likelihood value L_sd'_LSB is considered with a multiplication by −1. The transition probability $\gamma_{191}$ is furthermore weighted by the log-value of the phase slip probability P_slip$_\pi$ for a rotation of $\phi_{ROT}$=π.

If the next differentially decoded data symbol s(t=2) is s(t=2)='00', and if a phase slip with $$\varphi_{ROT} = \frac{3\pi}{2}$$

occurs, then a transition T1131 to the state S132, representing sd(t=2)='11' and also sd'(t=2)='01', occurs. The transition probability $\gamma_{191}$ is initialized to $\phi_{191}$=−L_sd'_MSB−L_sd'_LSB. Since the received corrected differentially encoded data symbol sd'(t=2) underlying the state S132 is equal to sd'(t=2)='01', the log-likelihood value L_sd'_MSB is considered with a multiplication by −1, while the log-likelihood value L_sd'_LSB is considered with a multiplication by +1. The transition probability $\gamma_{1131}$ is furthermore weighted by the log-value of the phase slip probability $$P\_slip_{+\frac{3\pi}{2}}$$

for a rotation of $$\varphi_{ROT} = +\frac{3\pi}{2}.$$

Further transitions and transition probabilities can be derived for different values of the differentially decoded data symbol s and for different rotation angles $\phi_{ROT}$, by following the principle explained with regard to FIG. 16.

Figure 17:
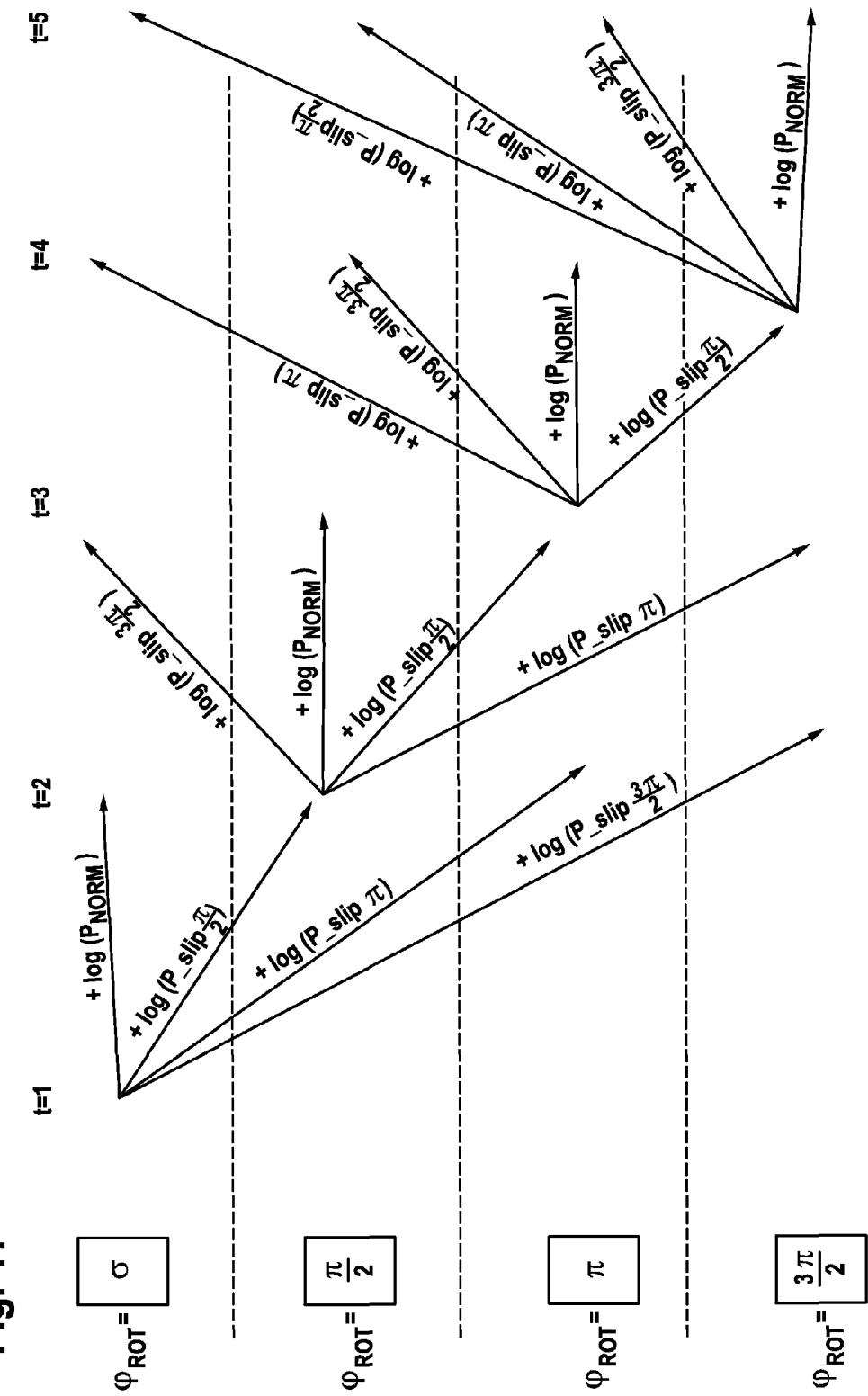
FIG. 17 shows states and transition probabilities of an estimation algorithm when using a QPSK constellation diagram.

FIG. 17 shows the estimation algorithm EA-Q of FIG. 16 at a more abstract level.

For consecutive time instances t=1, 2, 3, 4, 5, it is illustrated, in which way transition probabilities of transitions between states, that are associated to corresponding rotation angles $$\varphi_{ROT} = 0, +\frac{\pi}{2}, \pi, +\frac{3\pi}{2},$$

may be weighted by the previously mentioned predetermined phase slip probabilities $$P\_slip_{+\frac{\pi}{2}}, \quad P\_slip_{\pi}, \quad P\_slip_{+\frac{3\pi}{2}}, \quad P\_norm.$$

With regard to the FIGS. 15, 16 and 17, it has been described in detail, in which way states and transition probabilities can be stipulated to account for phase slips for a QPSK system. The stipulated states and state transitions may then be used within estimation algorithms, to derive differentially decoded data values and possibly even FEC decoded data values as previously described with regard to the FIGS. 7 to 12.

The general principle of stipulating states and transition probabilites for phase rotations of a PSK constellation diagram in case of one or more phase slips has been outlined with regard to the FIGS. 15, 16 and 17. To summarize the above, the estimation algorithm stipulates respective sets of hypothetical states for respective phase rotation angles of a PSK constellation diagram. The hypothetical states of each of the sets represent potentially transmitted differentially encoded data symbols for the respective phase rotation angle of the respective set. The transition probabilities between states of a first set at a first time instance and states of a second set at a second time instance are weighted on the basis of a predetermined phase slip probability value, which is related to a difference of the phase rotation angles of the first and the second set.

Figure 18:
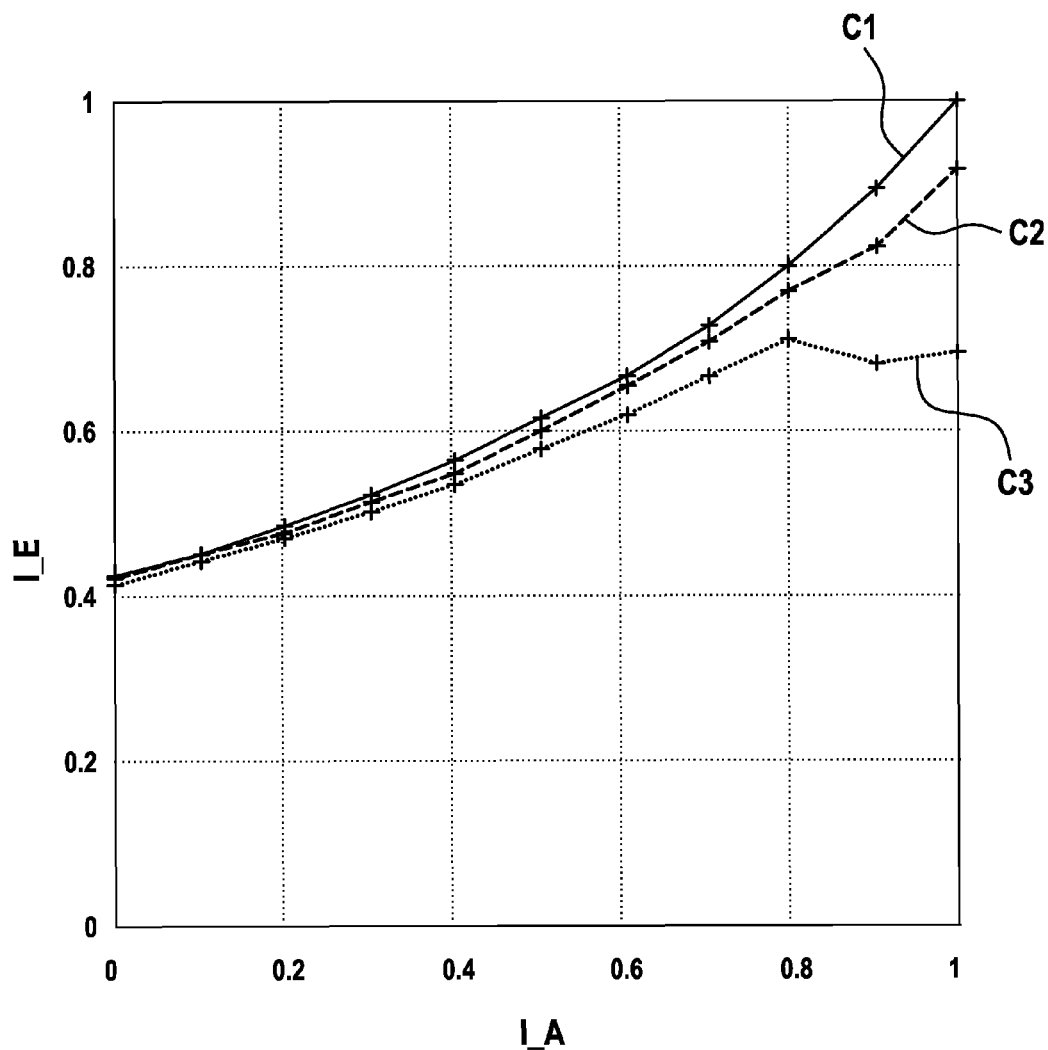
FIGS. 18, 19 and 20 show simulation results using and estimation algorithm with updated transition probabilities.

FIG. 18 shows an extrinsic information exchange (EXIT) chart, as described in "*Stephan ten Brink 'Convergence of iterative decoding', Electronics Letters,* 35(10:806-808, May 1999". The EXIT chart of FIG. 18 shows extrinsic information output I_E of the BCJR Algorithm BCJR-EA for a feedback of intrinsic information output I_A of the FEC decoding step FEC-DEC, shown in FIG. 9, for a LDPC code as the FEC code, when using an estimation algorithm as shown in FIG. 12, but without stipulating separate states and separate transition probabilities for the case of no phase slip or for the case of a phase slip. The first curve C1 shows the extrinsic information exchange for a phase slip probability of 0, the second curve C2 shows the extrinsic information exchange for a phase slip probability of 1/500, and the third curve C3 shows the extrinsic information exchange for a phase slip probability of 1/200. The energy per bit to noise power spectral density ratio Eb/N0 is equal to 2 dB, and a LDPC code with a code rate of 1/2 is used.

While for a phase slip probability of 0, the number of remaining data value errors goes to zero, which is equivalent to the point I_E=1 and I_A=1, after a number of iterations, when deriving the data values from the probability values provided by the BCJR algorithm. But it becomes clear, that for phase slip probability of 1/200, the decoding algorithm does not converge towards the point I_E=1 and I_A=1 where a number of zero data value errors may be reached, but the extrinsic information even decreases again after a certain number of iterations, which means that the number of remaining errors even increases.

Figure 19:
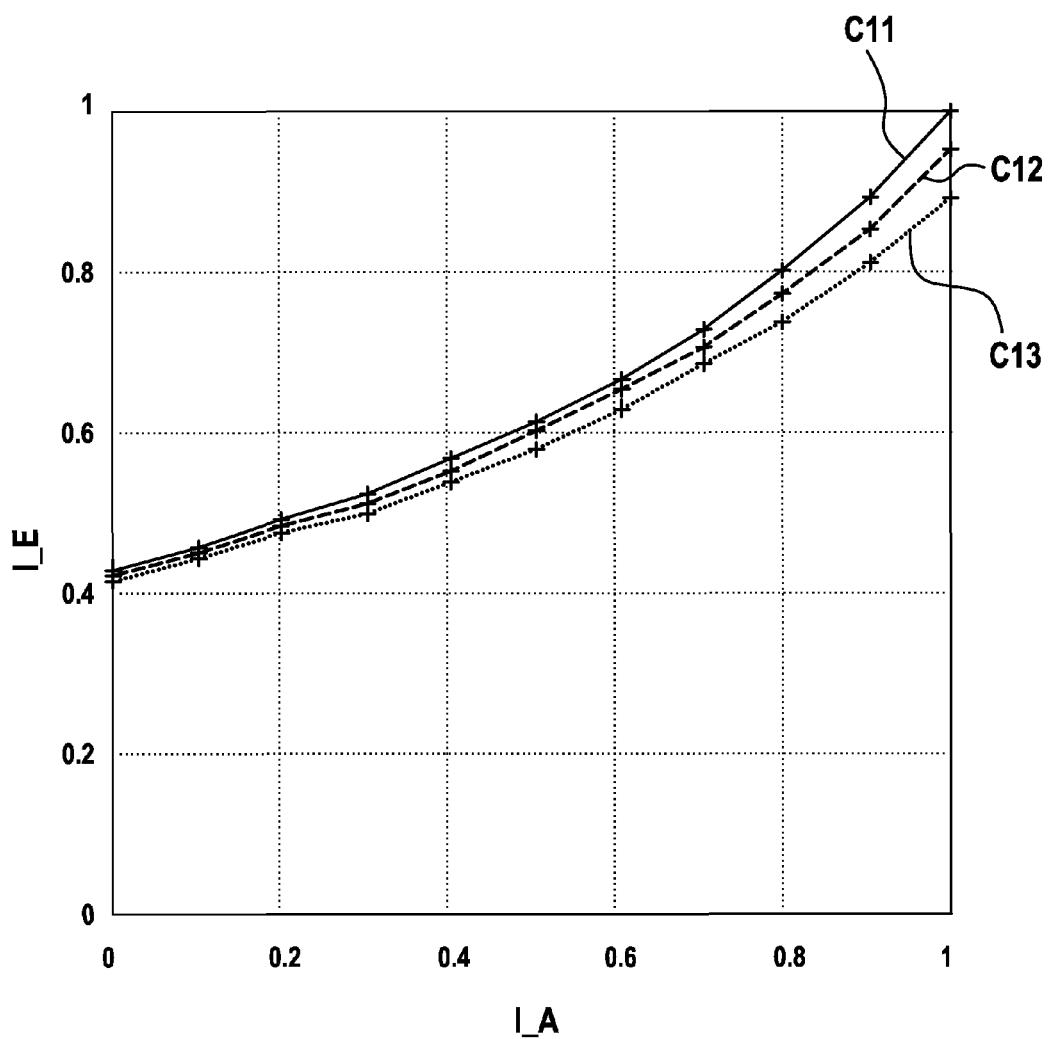

FIG. 19 shows extrinsic information output I_E of the BCJR Algorithm BCJR-EA for a feedback of intrinsic information output I_A of the FEC decoding step FEC-DEC, shown in FIG. 9, for a LDPC code as the FEC code, when using an estimation algorithm as shown in FIG. 12, which stipulates separate states and separate transition probabilities for the case of no phase slip and for the case of a phase slip. The curves C11, C12, C13 show the extrinsic information output for respective phase slip probabilities of 0, 1/500, 1/200 and 1/100. Also here, the energy per bit to noise power spectral density ratio Eb/N0 is equal to 2 dB, and a LDPC code with a code rate of 1/2 is used.

It becomes clear, that for all phase slip probabilities, which are greater than zero and were already considered in FIG. 18, the extrinsic information exchange output reaches for a same number of iterations a higher value, in comparison to an equivalent algorithm that does not stipulates states and transition probabilities for the case of a phase slip. Furthermore, the algorithm converges faster towards the point of I_E=1 and I_A=1. Furthermore, for an increasing number of iterations the extrinsic information output never decreases but increases.

Figure 20:
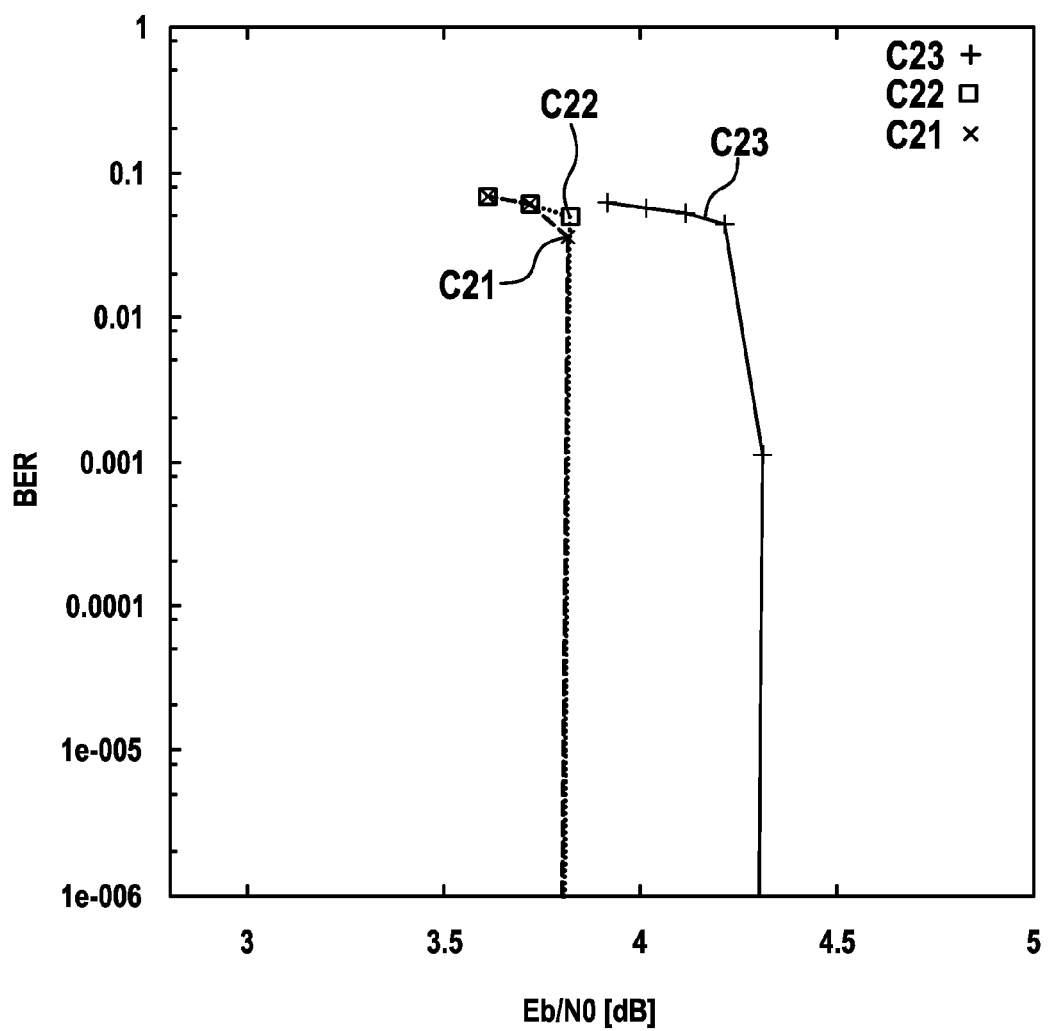

In FIG. 20, curves C21, C22, C23 of respective bit error ratios are shown versus the energy per bit to noise power spectral density ratio Eb/N0, using a LDPC code with a code rate of 5/6 as well as QPSK with differential encoding, for respective phase slip probabilities of 0, 1/1000, 1/100. The used algorithm stipulates states and transition probabilities for the case of no phase slip and for the case of a phase slip. The performance of the algorithm can be clearly seen by the fact, that even for a phase slip probability of 1/100 there is only a penalty of appr. 0.5 dB. Furthermore, for none of these simulations an error floor greater than $10^{-6}$ can be observed.

Figure 21:
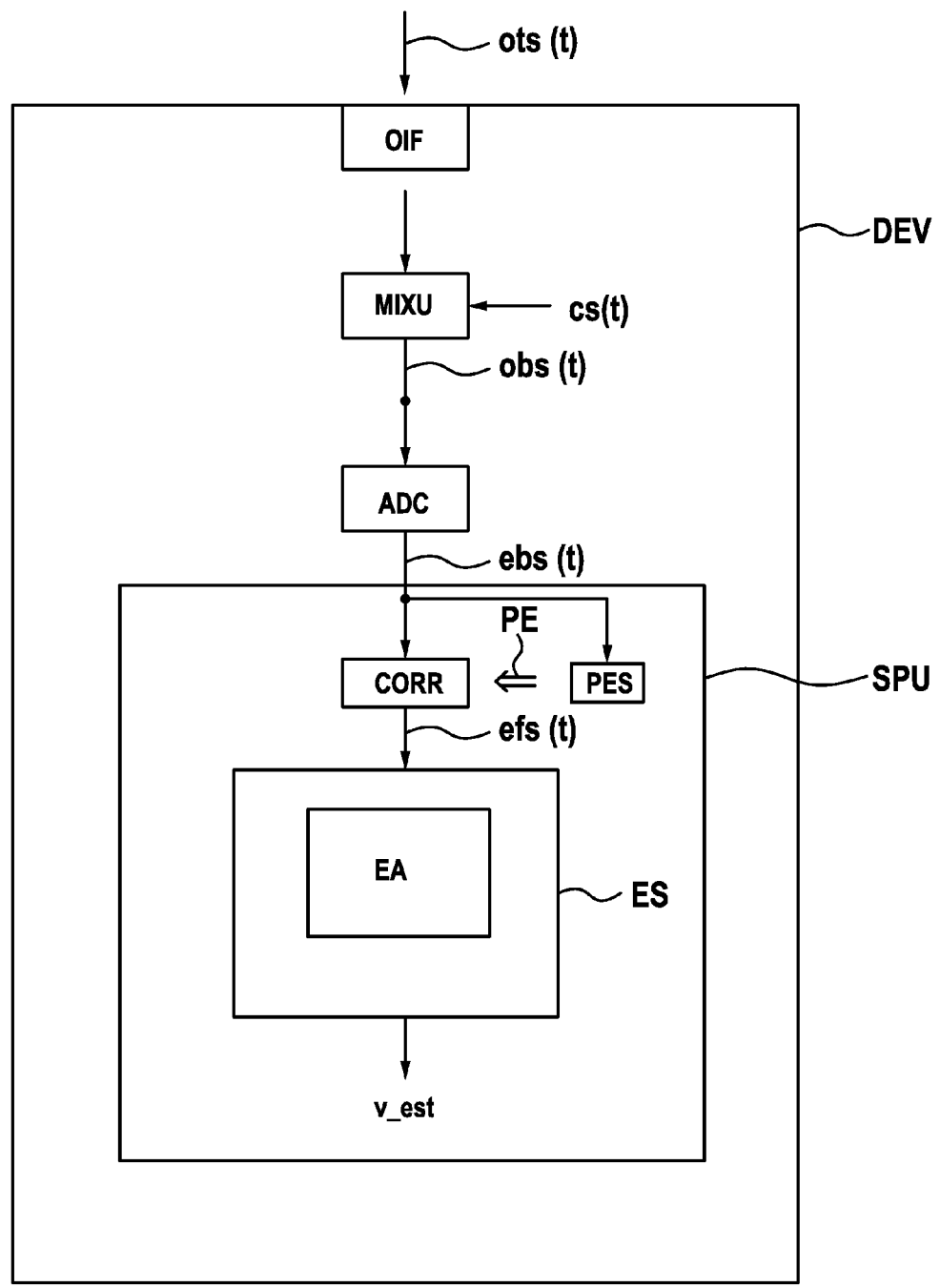
FIG. 21 shows a device for decoding optical data signals.

FIG. 21 shows a proposed device DEV for decoding optical data signals.

The device DEV contains an optical interface OIF, which is adapted to receive a differentially encoded phase-shift keying modulated optical signal ots(t). The optical interface OIF provides the received signal ots(t) to an optical mixing unit MIXU, which mixes the received signal ots(t) with a phase-coherent optical carrier signal cs(t). The carrier signal cs(t) possesses essentially the carrier frequency of an optical carrier signal used on a transmission side. The phase $\phi_{CS}$ of the optical phase-coherent carrier signal cs(t) is equal to the phase $\phi_{OCS}$ of the optical carrier signal used at the transmitting side plus/minus a whole numbered multiple of the PSK separation angle $\phi_{SEP\text{-}PSK}$ as $$\phi_{CS} = \phi_{OCS} \pm N \cdot \phi_{SEP\text{-}PSK}, \text{ with } N=0, 1, 2, \ldots.$$

An optical baseband signal obs(t) results from the mixing of the received signal ots(t) with the phase-coherent carrier signal cs(t). The optical baseband signal obs(t) is provided by the mixing unit MIXU to an analogue-digital conversion unit ADC.

The analogue-digital conversion unit ADC converts the optical baseband signal obs(t) into a time-discrete electrical baseband signal ebs(t), and provides the electrical baseband signal ebs(t) to a signal processing unit SPU.

In a phase estimation step PES, the signal processing unit SPU estimates from the electrical baseband signal ebs(t) a phase offset PE. The estimated phase offset PE is provided to a correction step CORR.

In the correction step CORR, the signal processing unit SPU changes the phase of the electrical baseband signal ebs (t) by the estimated phase offset PE. The result of this correction is a filtered electrical signal efs(t).

The filtered electrical signal efs(t) is provided to an estimation step ES. In the estimation step ES, estimated differentially decoded data values v_est are derived. For doing so, the estimation step ES uses an estimation algorithm EA.

The estimation algorithm EA accounts for a differential encoding rule used for differentially encoding the received differentially encoded phase-shift keying modulated optical signal ots(t).

The estimation algorithm EA is suitable to maximise a probability with respect to potentially transmitted differentially encoded data symbols or to maximise one or more probabilities with respect to the derived differentially decoded data values.

The estimation algorithm EA stipulates transition probabilities between first hypothetical states, representing potentially transmitted differentially encoded data symbols assuming that no phase slip has occurred, and second hypothetical states, representing potentially transmitted differentially encoded data symbols assuming that a phase slip has occurred. Then the transition probabilities between the first and the second states are weighted on the basis of a predetermined phase slip probability value.

The device DEV is furthermore adapted to carry out further steps of one or more methods described in this patent application. For calculation step, the device DEV may rely on the signal processing unit SPU and/or on other units not explicitly shown in FIG. 21.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the FIGS. 1, 2 and 3, including any functional blocks labelled as "device", "unit" or "processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the terms "processing unit", "device" or "unit" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. It should be appreciated by those skilled in the art that any block diagrams herein represent conceptual views of illustrative circuitry embodying the principles of the invention.

The invention claimed is:

1. A method of decoding optical data signals, comprising:
   correcting a received differentially encoded phase-shift keying modulated optical signal by an estimated phase offset,
   deriving differentially decoded data values from the corrected signal using an estimation algorithm which
      accounts for a differential encoding rule of said differentially encoded phase-shift keying modulated optical signal,
      is suitable to maximise a probability with respect to potentially transmitted differentially encoded data symbols or to maximise one or more probabilities with respect to the differentially decoded data values, and
      stipulates transition probabilities between first hypothetical states that represent potentially transmitted differentially encoded data symbols assuming that no phase slip has occurred, and towards second hypothetical states that represent potentially transmitted differentially encoded data symbols assuming that a phase slip has occurred,
   wherein the transition probabilities from one or more of said first hypothetical states towards one or more of said second hypothetical states are weighted on the basis of a predetermined phase slip probability value.

2. The method according to claim 1,
   wherein said estimation algorithm stipulates respective sets of hypothetical states for respective phase rotation angles of a phase-shift keying (PSK) constellation diagram, and
   wherein the hypothetical states of each of said sets represent potentially transmitted differentially encoded data symbols for the respective phase rotation angle of the respective set, and
   wherein transition probabilities between states of a first set at a first time instance and states of a second set at a second time instance are weighted on a basis of a predetermined phase slip probability value, which is related to a difference of the phase rotation angles of said first set and said second set.

3. The method according to claim 1,
   wherein said received optical data signal is further encoded by a forward error correction encoding algorithm, and
   wherein said estimation algorithm is suitable to maximise one or more probabilities with respect to the differentially decoded data values,
   the method further comprising
      deriving from the corrected optical signal probability values that indicate a probability of respective received differentially encoded data symbols,
   wherein said estimation algorithm determines from the derived probability values of said respective received differentially encoded data symbols probability values that indicate a probability of respective differentially decoded data values,
   the method further comprising
   modifying the determined probability values that indicate a probability of respective differentially decoded data values, using a suitable algorithm that accounts for said forward error correction encoding algorithm.

4. The method according to claim 3, further comprising
   weighting the stipulated transition probabilities, using the modified probability values that indicate a probability of respective differentially decoded data values.

5. The method according to claim 4, wherein said forward error correction encoding algorithm is a Low Density Parity Check Code.

6. A device for decoding optical data signals, wherein said device is adapted to:
   receive a differentially encoded phase-shift keying modulated optical signal,
   correct the received differentially encoded phase-shift keying modulated optical signal by an estimated phase offset,
   derive differentially decoded data values from the corrected differentially encoded phase-shift keying modulated optical signal using an estimation algorithm which
      accounts for a differential encoding rule of said differentially encoded phase-shift keying modulated optical signal,
      is suitable to maximise a probability with respect to potentially transmitted differentially encoded data symbols or to maximise one or more probabilities with respect to the differentially decoded data values, and
      stipulates transition probabilities between first hypothetical states that represent potentially transmitted differentially encoded data symbols assuming that no phase slip has occurred, and second hypothetical states that represent potentially transmitted differentially encoded data symbols assuming that a phase slip has occurred, wherein the transition probabilities between said first hypothetical states and said second hypothetical states are weighted on the basis of a predetermined phase slip probability value.

* * * * *